United States Patent
Imaoka et al.

(10) Patent No.: US 12,072,548 B2
(45) Date of Patent: Aug. 27, 2024

(54) INTERCHANGEABLE LENS, IMAGE PROJECTION APPARATUS AND IMAGING APPARATUS

(71) Applicant: Panasonic Intellectual Property Management Co., Ltd., Osaka (JP)

(72) Inventors: Takuya Imaoka, Kanagawa (JP); Qinghua Zhao, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 339 days.

(21) Appl. No.: 17/387,028

(22) Filed: Jul. 28, 2021

(65) Prior Publication Data
US 2021/0356693 A1 Nov. 18, 2021

Related U.S. Application Data

(63) Continuation of application No. PCT/JP2019/043714, filed on Nov. 7, 2019.

(30) Foreign Application Priority Data

Feb. 27, 2019 (JP) .................................. 2019-034829

(51) Int. Cl.
*G02B 7/14* (2021.01)
*G02B 13/02* (2006.01)
(Continued)

(52) U.S. Cl.
CPC .............. *G02B 7/14* (2013.01); *G02B 13/02* (2013.01); *G02B 13/06* (2013.01); *G02B 15/146* (2019.08); *G03B 17/14* (2013.01)

(58) Field of Classification Search
CPC .......... G02B 7/14; G02B 13/02; G02B 13/06; G02B 15/146; G02B 7/04; G02B 15/144111; G03B 17/14
See application file for complete search history.

(56) References Cited

U.S. PATENT DOCUMENTS 6,271,882 B1 * 8/2001 Kawamura ............ G02B 7/102
348/240.99
8,149,320 B2 * 4/2012 Sakai ..................... G02B 7/102
348/335
(Continued)

FOREIGN PATENT DOCUMENTS

CN 206818967 U 12/2017
EP 1 845 400 10/2007
(Continued)

OTHER PUBLICATIONS

International Search Report issued Feb. 10, 2020 in International (PCT) Application No. PCT/JP2019/043714 with English translation.

(Continued)

*Primary Examiner* — Alicia M Harrington
(74) *Attorney, Agent, or Firm* — Wenderoth, Lind & Ponack, L.L.P.

(57) ABSTRACT

The present embodiment discloses an interchangeable lens that can be detachably attached to an apparatus body having an image forming surface on which an image is formed, and the interchangeable lens has a magnification conjugate point on a magnification side and a reduction conjugate point on a reduction side. The interchangeable lens includes a focus lens group that can move along an optical axis to adjust a focus at the magnification conjugate point and a flange back distance correction lens group that can move along the optical axis to correct an error in a flange back distance of the interchangeable lens with respect to the image forming surface.

14 Claims, 20 Drawing Sheets

(51) Int. Cl.
  *G02B 13/06* (2006.01)
  *G02B 15/14* (2006.01)
  *G03B 17/14* (2021.01)

(56) References Cited

U.S. PATENT DOCUMENTS

| | | |
|---|---|---|
| 2005/0122595 A1 | 6/2005 | Nurishi |
| 2009/0034097 A1 | 2/2009 | Yakita |
| 2010/0091175 A1* | 4/2010 | Shintani .................. G02B 7/365 |
| | | 348/E5.045 |
| 2010/0290133 A1 | 11/2010 | Sano et al. |
| 2015/0268453 A1 | 9/2015 | Oe et al. |
| 2017/0343778 A1 | 11/2017 | Amano |
| 2018/0307040 A1 | 10/2018 | Miyazawa |
| 2018/0307041 A1 | 10/2018 | Masui et al. |
| 2019/0235197 A1 | 8/2019 | Kuwashiro |

FOREIGN PATENT DOCUMENTS

| | | |
|---|---|---|
| JP | 2005-140969 | 6/2005 |
| JP | 2007-178894 | 7/2007 |
| JP | 2009-036844 | 2/2009 |
| JP | 2009-199020 | 9/2009 |
| JP | 2010-266577 | 11/2010 |
| JP | 2015-179270 | 10/2015 |
| JP | 2017-211480 | 11/2017 |
| JP | 2018-180132 | 11/2018 |
| JP | 2018-180447 | 11/2018 |
| JP | 2018-182679 | 11/2018 |
| JP | 2019-008088 | 1/2019 |
| JP | 6469284 | 2/2019 |

OTHER PUBLICATIONS

English translation of International Preliminary Report on Patentability issued Sep. 10, 2021 in International Application No. PCT/JP2019/043714.
Office Action issued Apr. 25, 2023 in corresponding Japanese Patent Application No. 2021-501560, with Machine translation.
Office Action issued Sep. 15, 2023 in corresponding Chinese Patent Application No. 201980091588.7, with Machine translation, 17 pages.
Office Action issued Feb. 12, 2024 in corresponding European Patent Application No. 19916738.8, 5 pages.
Extended European Search Report issued Mar. 10, 2022 in corresponding European Patent Application No. 19916738.8.

* cited by examiner

INTERCHANGEABLE LENS, IMAGE PROJECTION APPARATUS AND IMAGING APPARATUS

CROSS-REFERENCE OF RELATED APPLICATIONS

This application is a continuation of International Patent Application No. PCT/JP2019/043714, filed on Nov. 7, 2019, which claims the benefit of Japanese Patent Application No. 2019-034829, filed on Feb. 27, 2019, the contents all of which are incorporated herein by reference.

TECHNICAL FIELD

The present disclosure relates to an interchangeable lens that is detachably attached to an apparatus body of an image projection apparatus, an imaging apparatus, or the like. The present disclosure further relates to an image projection apparatus and an imaging apparatus using such an interchangeable lens.

BACKGROUND

Patent Document 1 discloses a projection optical system capable of projecting a large image with a short projection distance. In this projection optical system, an intermediate image is formed between two optical systems, and thereafter a plane mirror M1 for bending an optical path is provided between the two optical systems. Patent Document 1 refers to correction of a focus shift due to a lens manufacturing error (paragraph [0047], etc.). Specifically, in this projection optical system, when an error occurs at an in-focus position of a first focusing unit belonging to one of the two optical systems, a second focusing unit belonging to the other optical system makes fine adjustments, thereby both the first focusing unit and the second focusing unit can move during focusing.

PATENT DOCUMENT

[Patent Document 1] JP 2018-180447 A

SUMMARY

The present disclosure provides an interchangeable lens that is detachably attached to an apparatus body and can reduce an impact of a flange back distance error while suppressing an occurrence of curvature of field even when the apparatus body has the flange back distance error. The present disclosure further provides an image projection apparatus and an imaging apparatus using such an interchangeable lens.

One aspect of the present disclosure is directed to an interchangeable lens that can be detachably attached to an apparatus body having an image forming surface on which an image is formed, and the interchangeable lens having a magnification conjugate point on a magnification side and a reduction conjugate point on a reduction side. The interchangeable lens includes a focus lens group that can move along an optical axis to adjust a focus at the magnification conjugate point. The interchangeable lens further includes a flange back distance correction lens group that can move along the optical axis to correct an error in a flange back distance of the interchangeable lens with respect to the image forming surface.

Further, an image projection apparatus according to the present disclosure includes the above-described interchangeable lens and an image forming element that generates an image to be projected through the interchangeable lens onto a screen.

Still further, an imaging apparatus according to the present disclosure includes the above-described interchangeable lens and an imaging element that receives an optical image formed by the interchangeable lens to convert the optical image into an electrical image signal.

The interchangeable lens according to the present disclosure can reduce an impact of a flange back distance error while suppressing an occurrence of curvature of field even when the apparatus body has the flange back distance error.

DESCRIPTION OF EMBODIMENT

Hereinafter, embodiments are described in detail with reference to the drawings as appropriate. However, unnecessarily detailed descriptions may be omitted. For example, detailed descriptions of well-known items or redundant descriptions of substantially the same configurations may be omitted. This is to prevent the following description from being unnecessarily redundant and to facilitate understanding by those skilled in the art.

It should be noted that the applicant provides the accompanying drawings and the following description for those skilled in the art to fully understand the present disclosure, and it is not intended to limit the subject matter described in the claims thereby.

Each example of an interchangeable lens according to the present disclosure is described below. In each example, described is an example in which the imaging optical system is used in a projector (an example of an image projection apparatus) that projects onto a screen image light of an original image S obtained by spatially modulating incident light using an image forming element, such as liquid crystal or digital micromirror device (DMD), based on an image signal. In other words, the interchangeable lens according to the present disclosure can be used for magnifying the original image S on the image forming element arranged on the reduction side to project the image onto the screen (not shown), which is arranged on an extension line on the magnification side.

Further, the interchangeable lens according to the present disclosure can also be used in an imaging apparatus for collecting light emitted from an object located on the extension line on the magnification side to form an optical image of the object on an imaging surface of an imaging element arranged on the reduction side.

(Overview)

Figure 1:
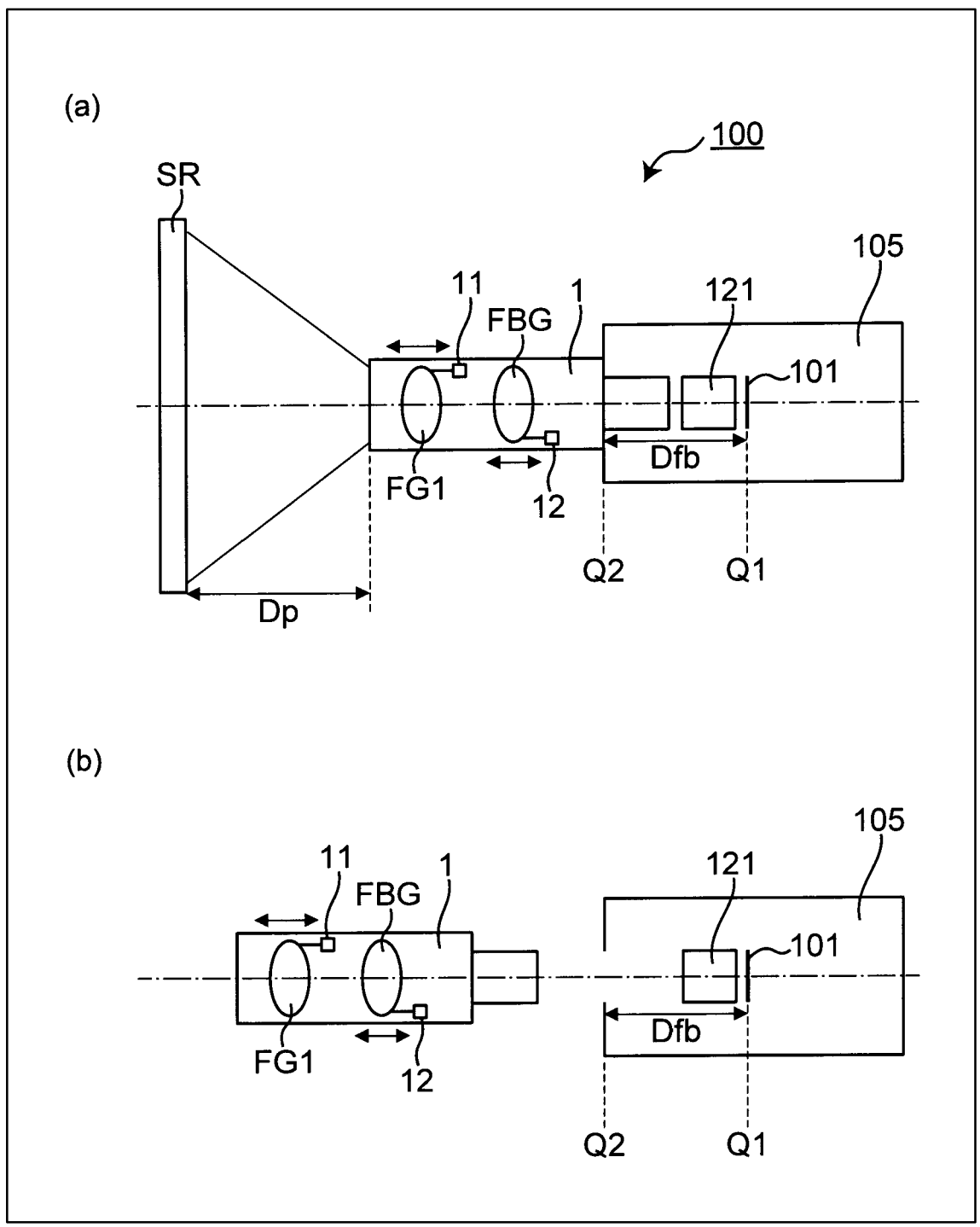
FIG. 1 is a block diagram for describing an overview of the present disclosure.

FIG. 1 is a block diagram for describing the overview of the present disclosure. FIG. 1(a) shows a state where an interchangeable lens 1 is attached to an apparatus body 105, and FIG. 1(b) shows a state where the interchangeable lens 1 is detached from the apparatus body 105. By way of example, an image projection apparatus is described below.

The image projection apparatus 100 includes the apparatus body 105 and the interchangeable lens 1 that can be detachably attached to a mount surface Q2 of the apparatus body 105. The apparatus body 105 includes an image forming element 101, a prism 121, a light source (not shown), and a controller (not shown), and the like. The image forming element 101 is made up of, for example, liquid crystal, DMD, to generate an image on an image forming surface Q1, and then the image is projected onto a screen SR through the interchangeable lens 1. The screen SR is installed at a projection distance Dp from the interchangeable lens 1. The prism 121 is provided between the image forming surface Q1 of the image forming element 101 and the mount surface Q2 to function for supplying light from the light source to the image forming element 101, and for transmitting light from the image forming element 101 to the interchangeable lens 1.

The interchangeable lens 1 has a magnification conjugate point on the magnification side and a reduction conjugate point on the reduction side. The interchangeable lens 1 may internally have an intermediate imaging position that is conjugate to the magnification conjugate point and the reduction conjugate point, respectively. In this case the intermediate imaging position inside the interchangeable lens 1 facilitates to manufacture the wide-angle type of interchangeable lens 1. The interchangeable lens 1 includes a lens barrel accommodating a lens, and a mount mechanism which can be engaged with the mount surface Q2 is provided on an end face of the reduction side of the lens barrel. Examples of a mount type of the mount mechanism include various mount types, such as screw type, bayonet type, and spigot type.

A flange back distance Dfb is defined as a distance between the image forming surface Q1 and the mount surface Q2. The interchangeable lens 1 can be attached to any apparatus body 105 as long as the apparatus body 105 has the same flange back distance Dfb. The flange back distance Dfb may, however, be varied among the respective apparatuses due to an error in manufacture or assembly of the apparatus body 105, an environmental condition, or the like. When there is an error in the flange back distance Dfb, large curvature of field may occur on the screen SR even when the interchangeable lens 1 having the same performance is attached.

In order to address this problem, the interchangeable lens 1 includes a flange back distance correction lens group FBG that can move along the optical axis to correct an error in the flange back distance of the interchangeable lens 1 with respect to the image forming surface Q1. The interchangeable lens 1 further includes a focus lens group FG1 that can move along the optical axis to adjust a focus on the screen SR (magnification conjugate point).

In general, a wide-angle lens such as an ultra-short focus lens tends to cause large curvature of field due to an error in the flange back distance, with a change in the projection distance Dp. In order to correct such an error, the focus lens group FG1 for use in correction of the curvature of field and flange back distance is provided. When an error in the flange back distance occurs in the apparatus body 105, adjustment using the focus lens group FG1 to eliminate the flange back distance error may generate curvature of field. In this regard the interchangeable lens according to the present embodiment is capable of correcting the flange back distance error of the apparatus body by using the flange back distance correction lens group FBG. This can reduce an impact of the flange back distance error while suppressing the occurrence of curvature of field.

In order to eliminate individual variations of the apparatus body 105, the flange back distance correction lens group FBG may be adjusted in position after the interchangeable lens 1 is attached to the apparatus body 105. This allows the flange back distance to be adjusted for each apparatus body 105. Then, after the flange back distance adjustment is made, the focus adjustment is made by using the focus lens group FG1. Further, if necessary, as will be described later, the curvature of field may be corrected through positional adjustments of some of the lenses belonging to the focus lens group FG1.

Next, a drive system of the lens group will be described below. As shows in FIG. 1, the focus lens group FG1 may be driven and adjusted in position along the optical axis by a focus drive unit 11. The flange back distance correction lens group FBG may be driven and adjusted in position along the optical axis by a flange back distance adjustment mechanism 12. The flange back distance adjustment mechanism 12 may be, for example, a mechanism manually operable by a user. The focus drive unit 11 and the flange back distance adjustment mechanism 12 may be each made up of a motor, an actuator, a cam, a deceleration mechanism, and the like. The focus drive unit 11 and the flange back distance adjustment mechanism 12 may be individually operated, and the flange back distance correction lens group FBG is fixed particularly during focusing or zooming.

Although the image projection apparatus has been described here, the flange back distance correction is also applicable to an imaging apparatus as described later. In this case, a light receiving surface of an imaging element corresponds to the image forming surface Q1, and it is also possible to correct a flange back distance error between the image forming surface Q1 and the mount surface Q2 to which the interchangeable lens 1 is attached, by using the flange back distance correction lens group FBG.

First Embodiment

Hereinafter, a first embodiment of the present disclosure will be described below with reference to FIGS. 2 to 21. Here, zoom lens systems according to examples 1 to 3 and a prime lens system according to example 4 as an example of the interchangeable lens.

Figure 8:
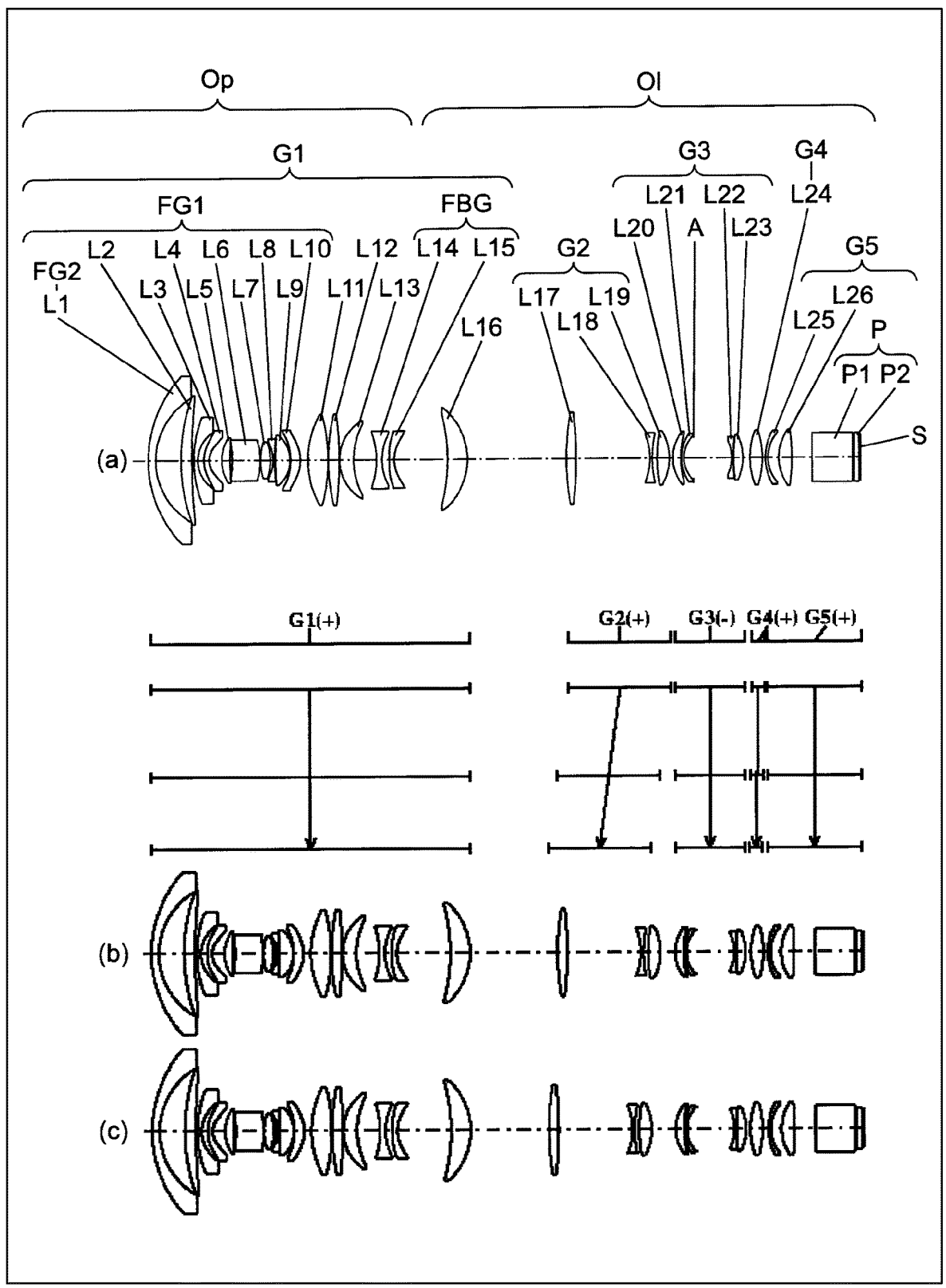
FIG. 8 is a layout diagram of the zoom lens system of example 2 for an object distance of 900 mm.
Figure 9:
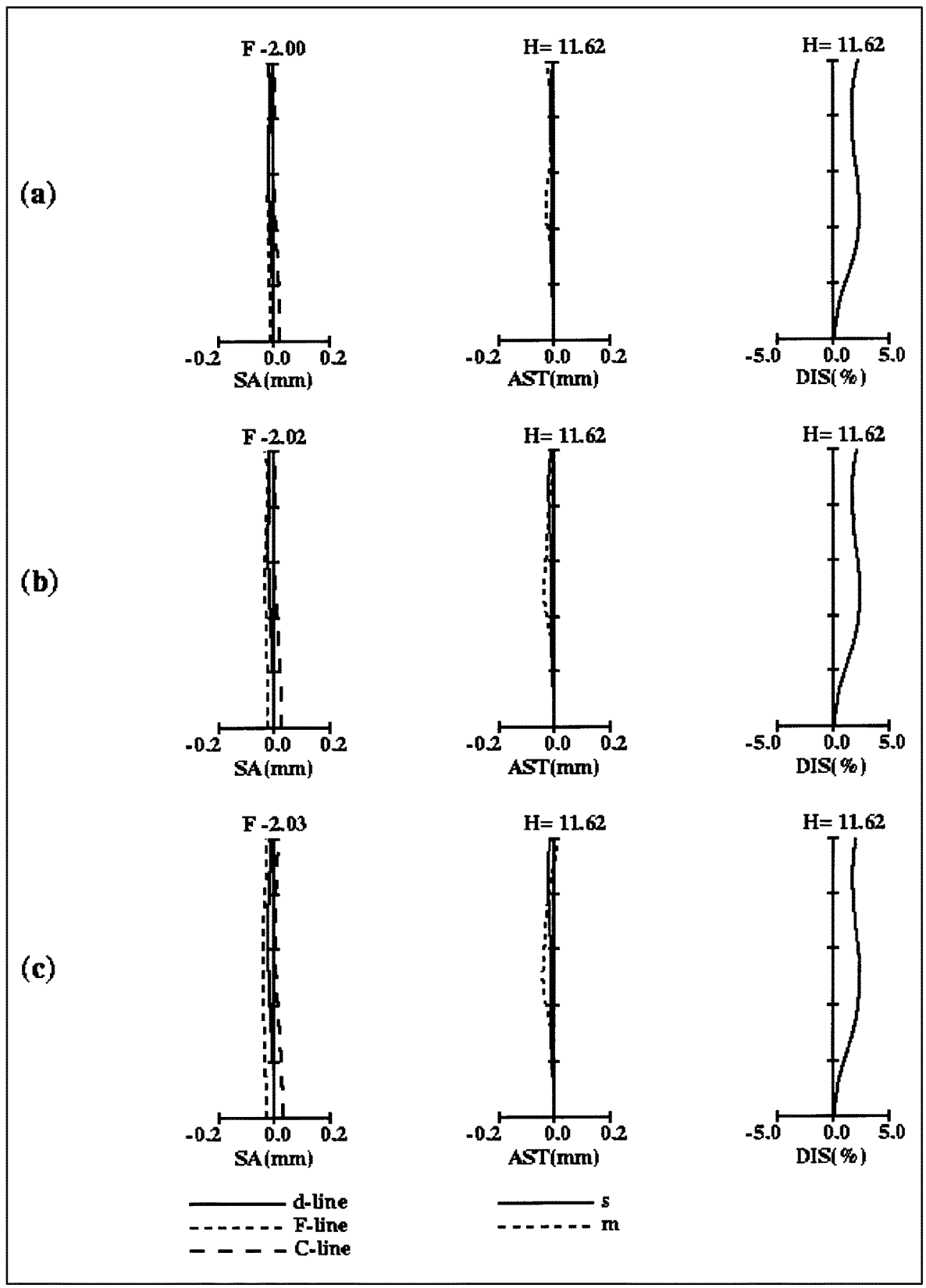
FIG. 9 is a longitudinal aberration diagram of the zoom lens system of example 2 for an object distance of 900 mm.
Figure 10:
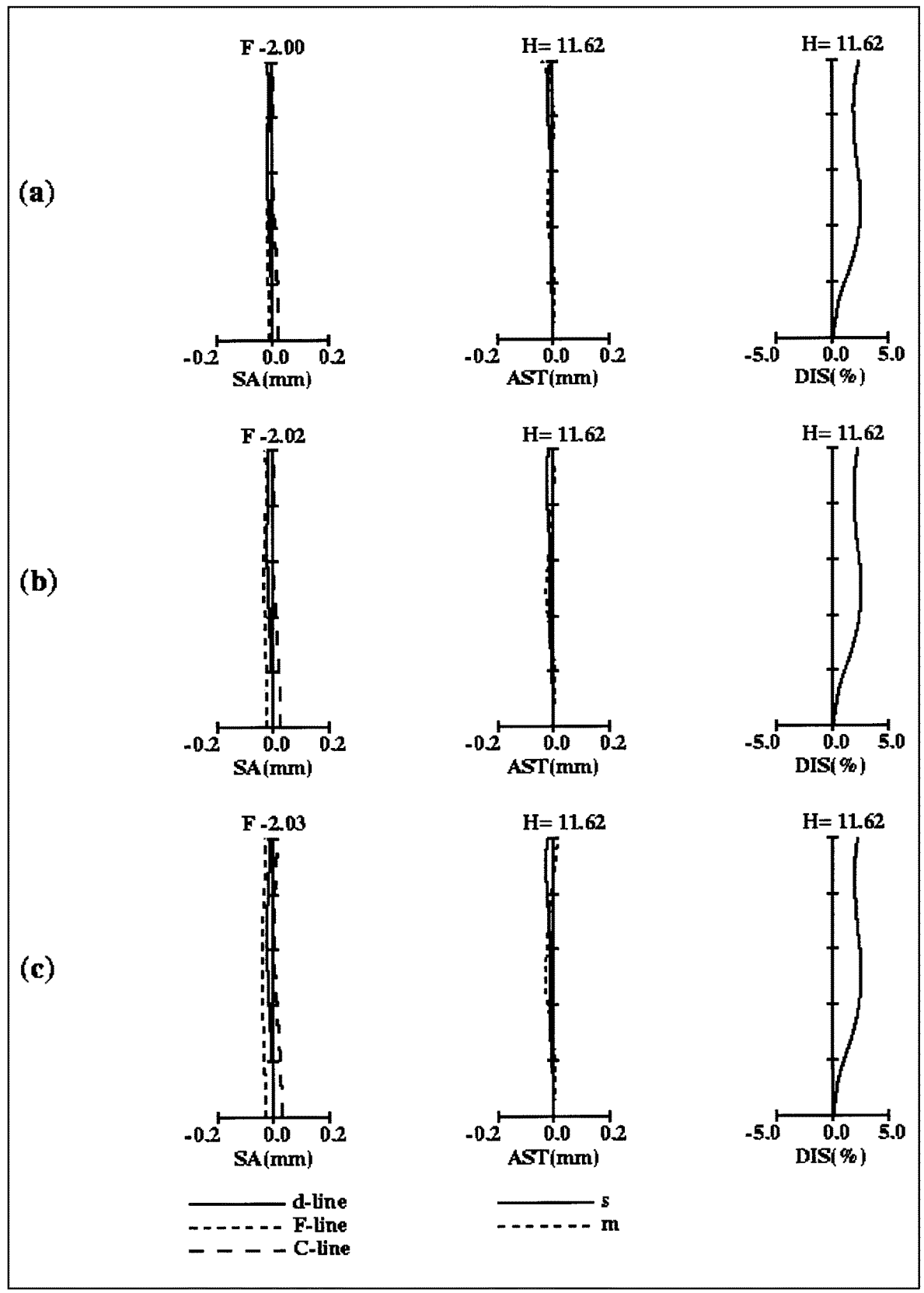
FIG. 10 is a longitudinal aberration diagram of the zoom lens system of example 2 for an object distance of 600 mm.
Figure 11:
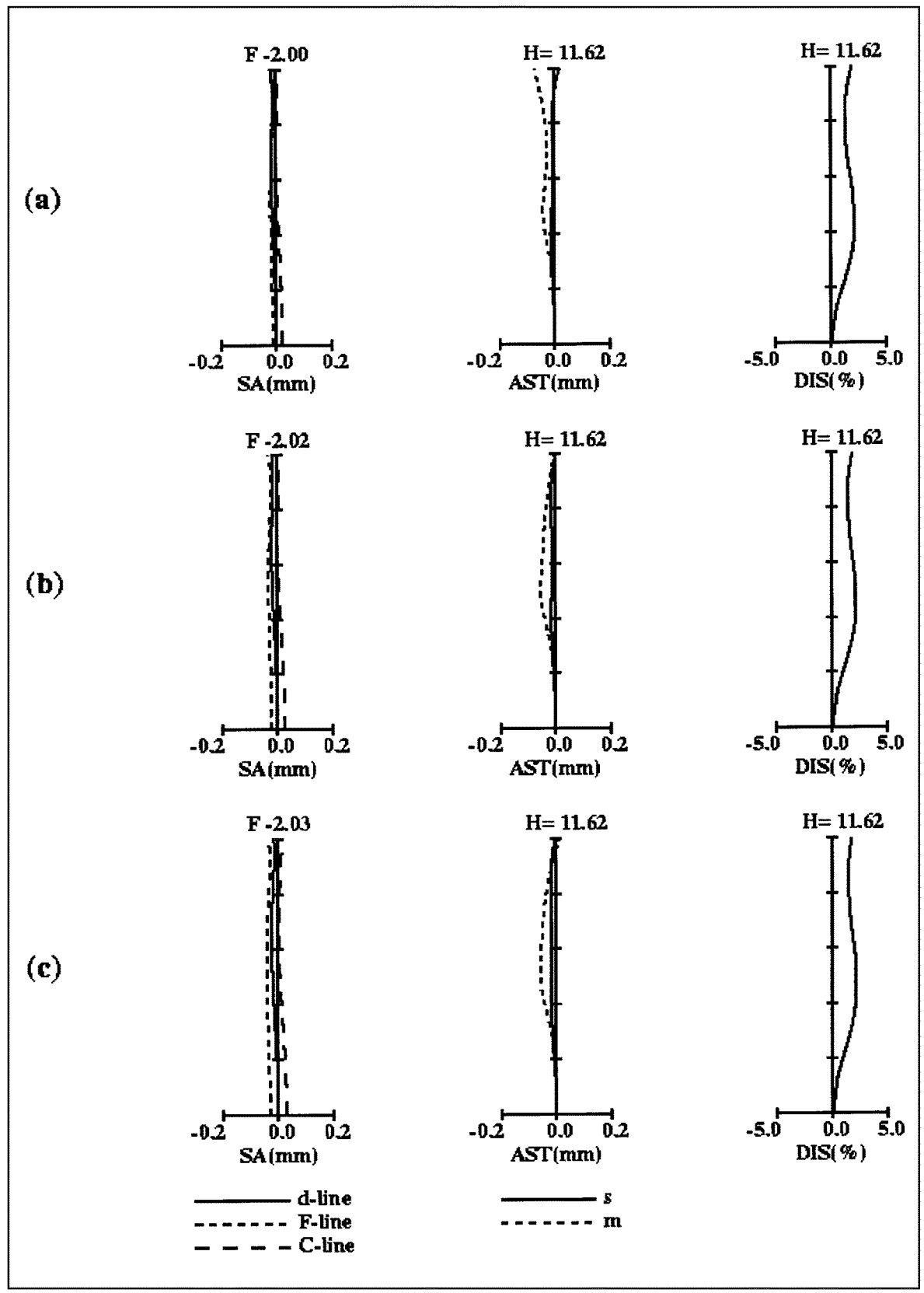
FIG. 11 is a longitudinal aberration diagram of the zoom lens system of example 2 for an object distance of 2400 mm.
Figure 12:
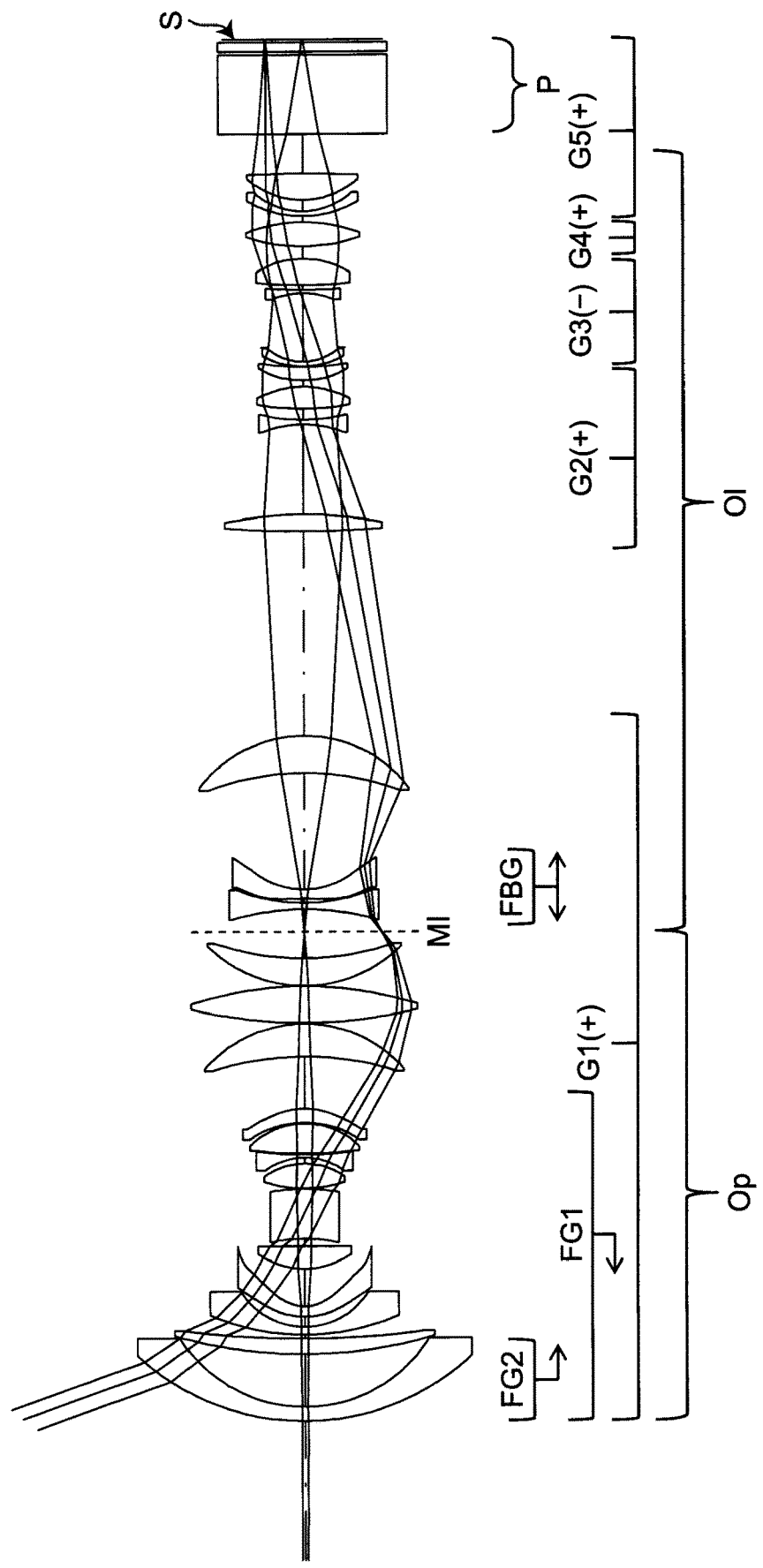
FIG. 12 is a layout diagram showing an optical path at a wide-angle end in a zoom lens system of example 3 for an object distance of 900 mm.
Figure 13:
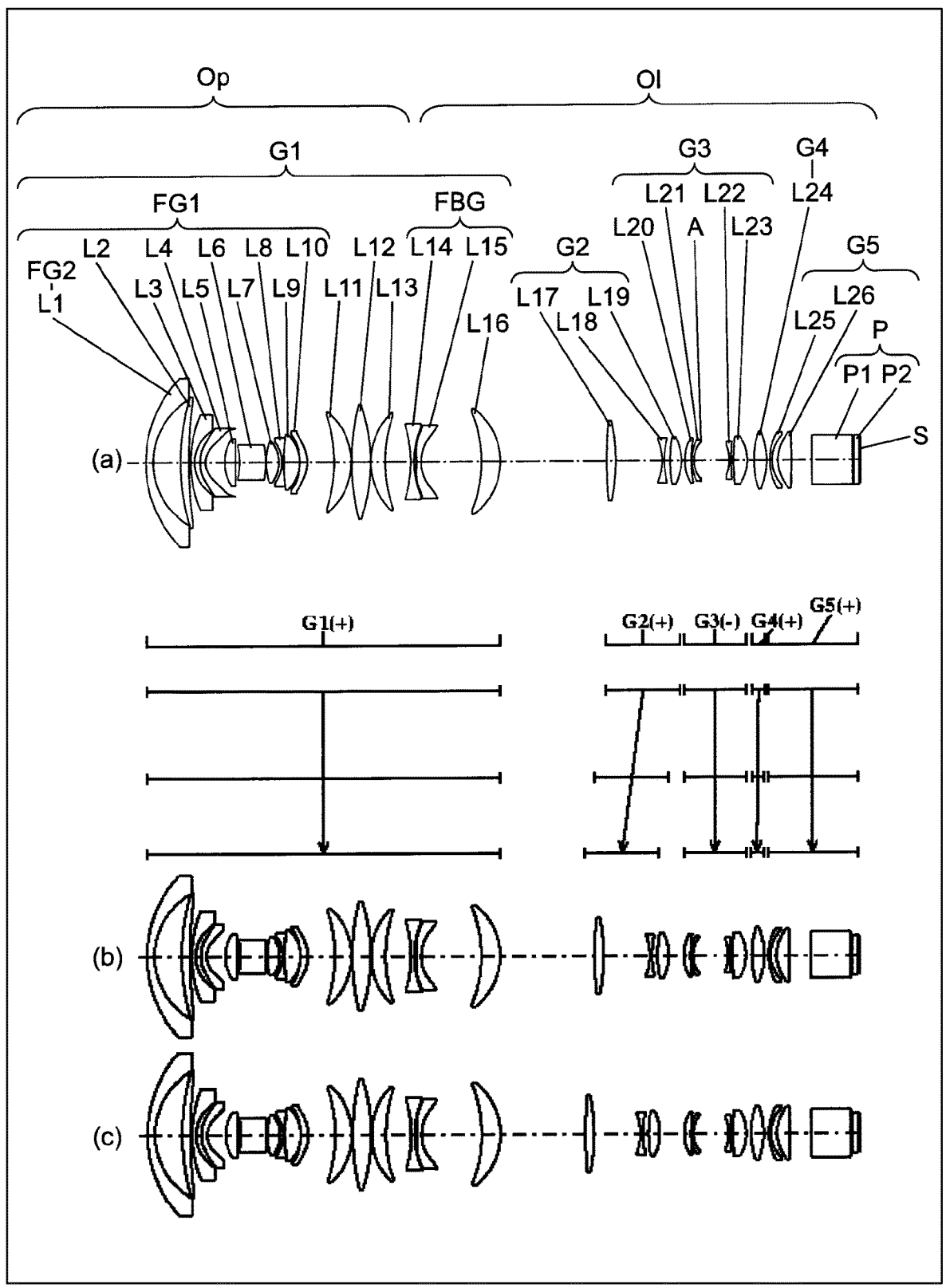
FIG. 13 is a layout diagram of the zoom lens system of example 3 for an object distance of 900 mm.
Figure 14:
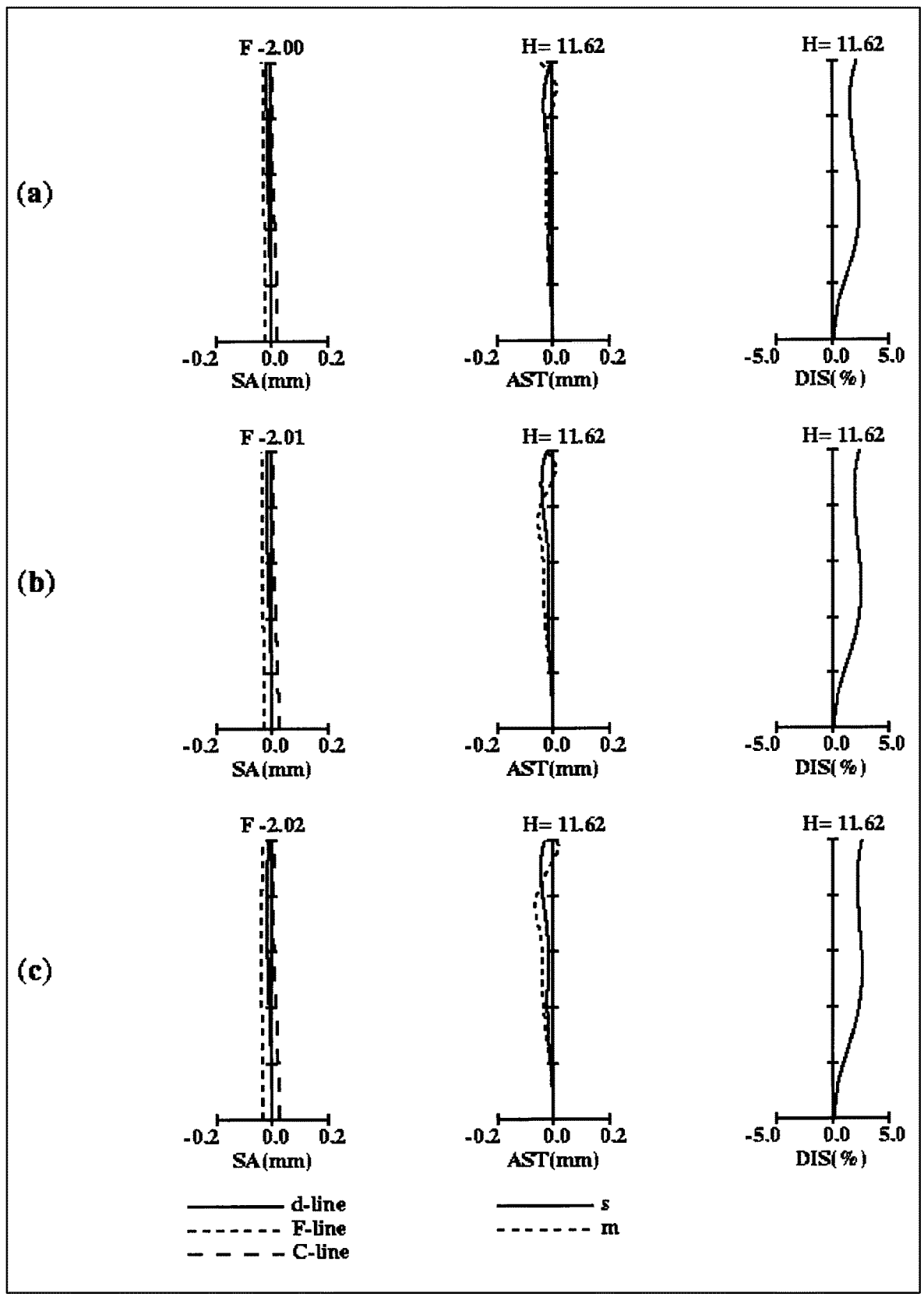
FIG. 14 is a longitudinal aberration diagram of the zoom lens system of example 3 for an object distance of 900 mm.
Figure 15:
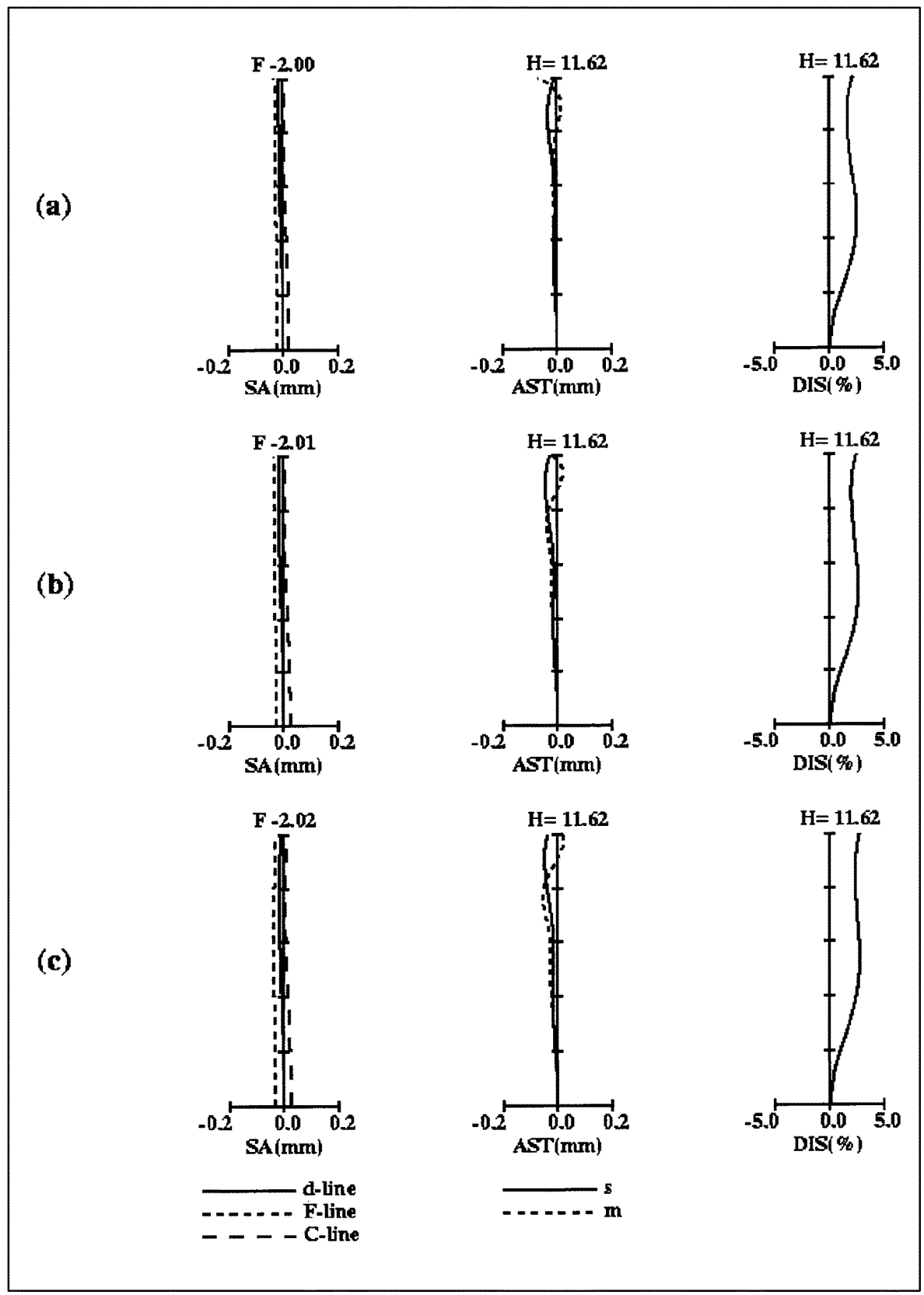
FIG. 15 is a longitudinal aberration diagram of the zoom lens system of example 3 for an object distance of 600 mm.
Figure 16:
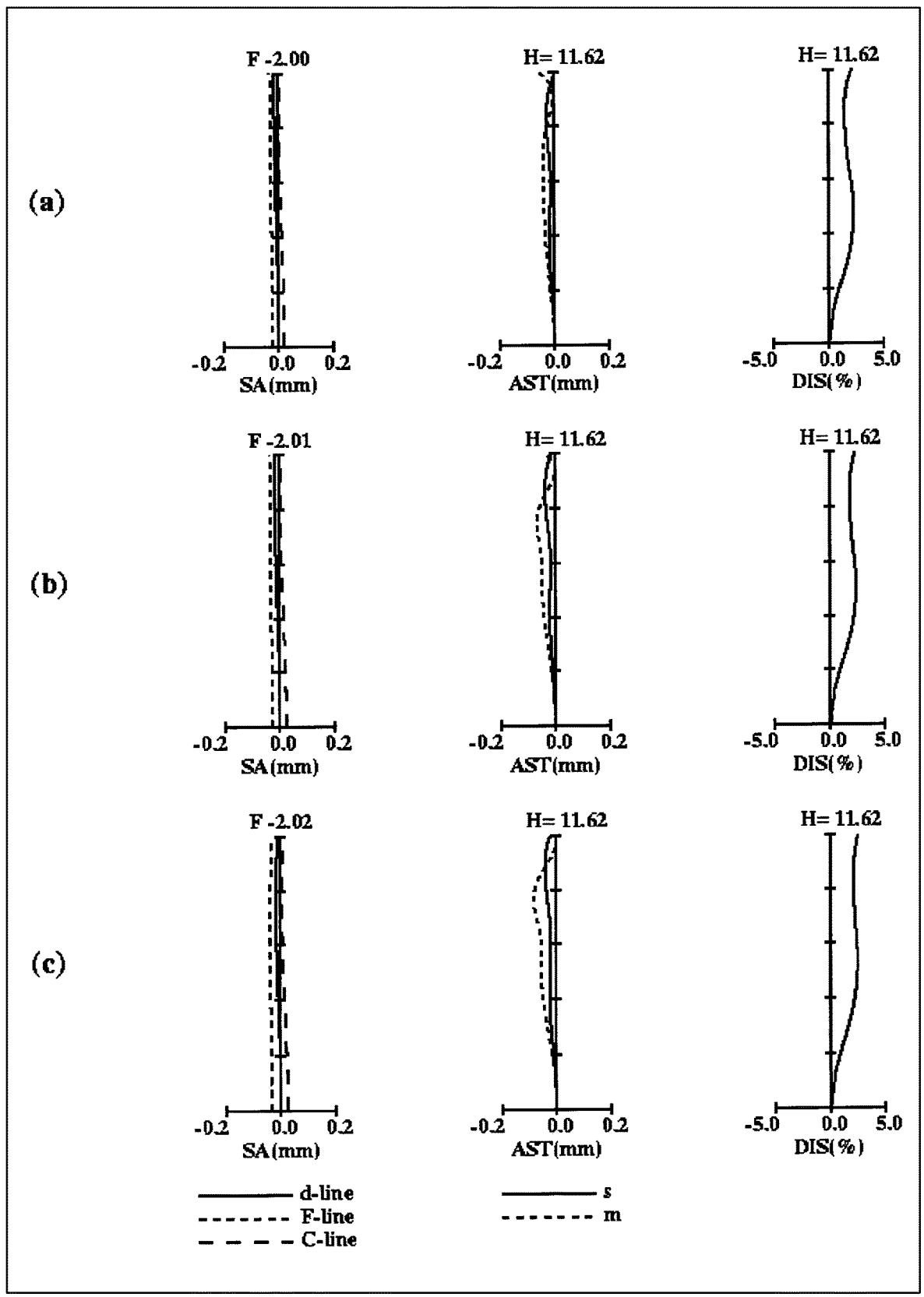
FIG. 16 is a longitudinal aberration diagram of the zoom lens system of example 3 for an object distance of 2400 mm.
Figure 17:
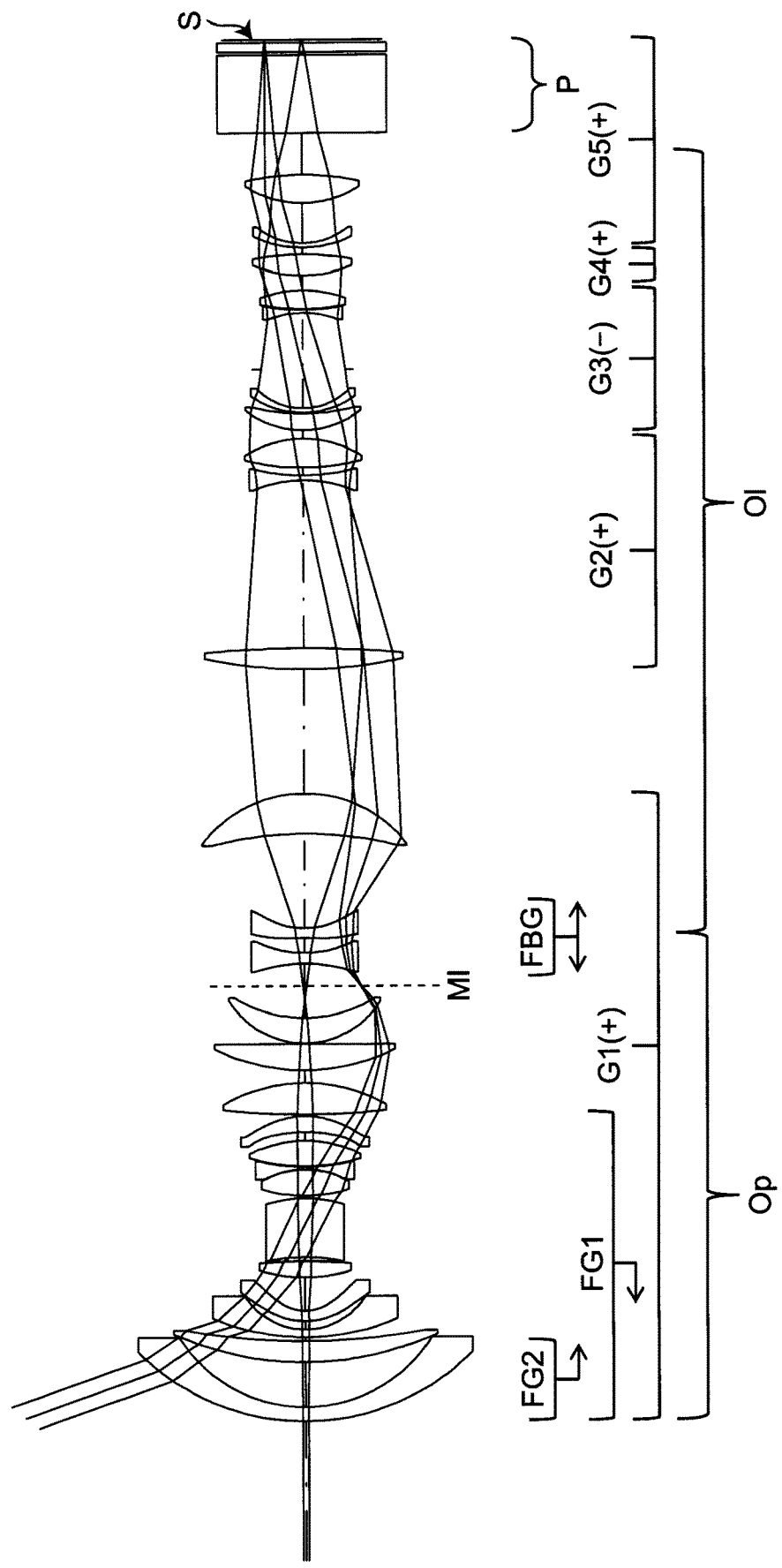
FIG. 17 is a layout diagram showing an optical path at a wide-angle end in a zoom lens system of example 4 for an object distance of 900 mm.
Figure 18:
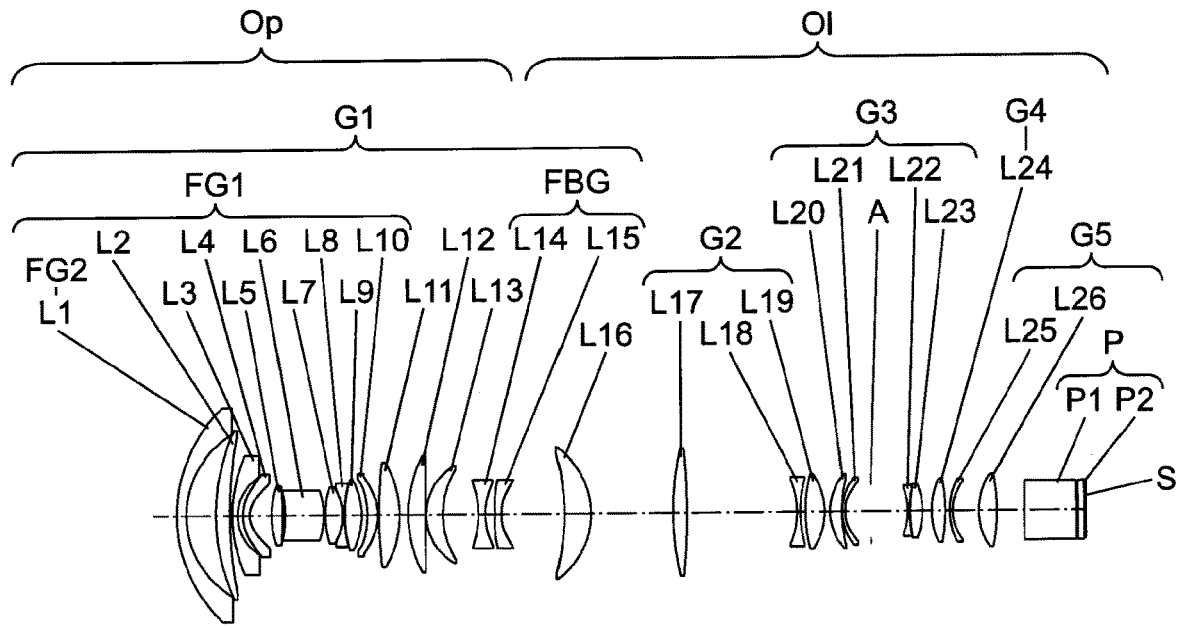
FIG. 18 is a layout diagram of the zoom lens system of example 4 for an object distance of 900 mm.
Figure 19:
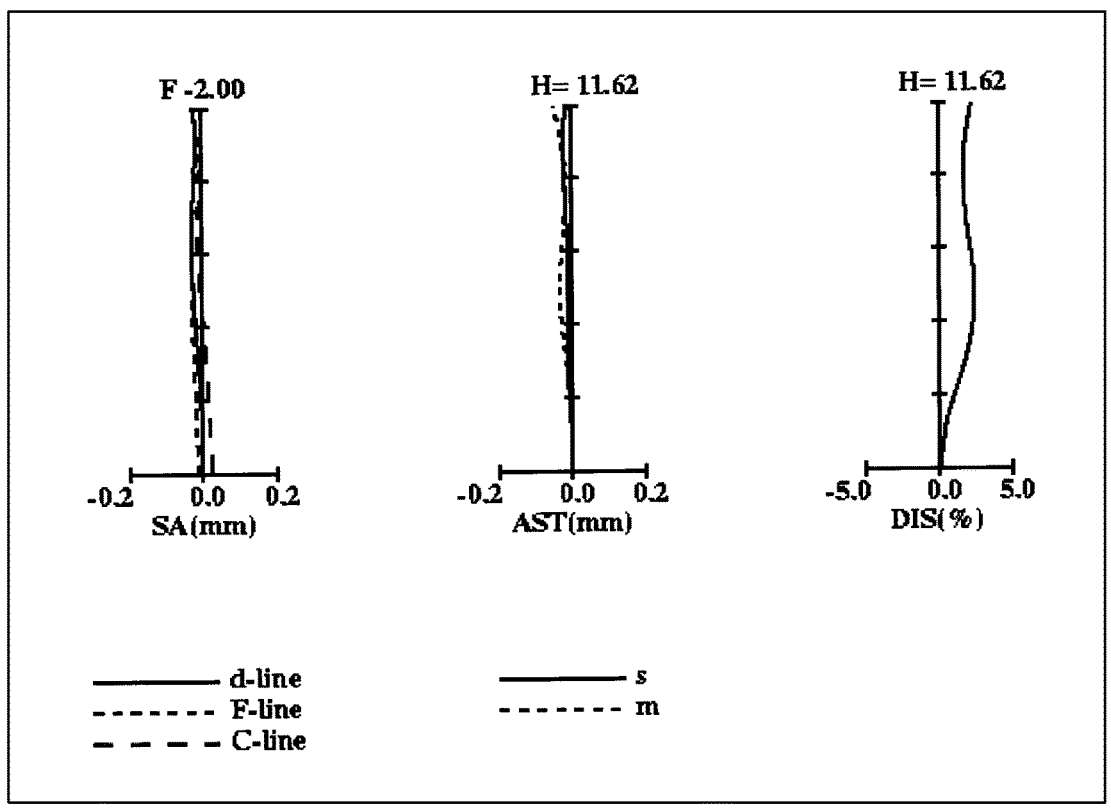
FIG. 19 is a longitudinal aberration diagram of the zoom lens system of example 4 for an object distance of 900 mm.
Figure 20:
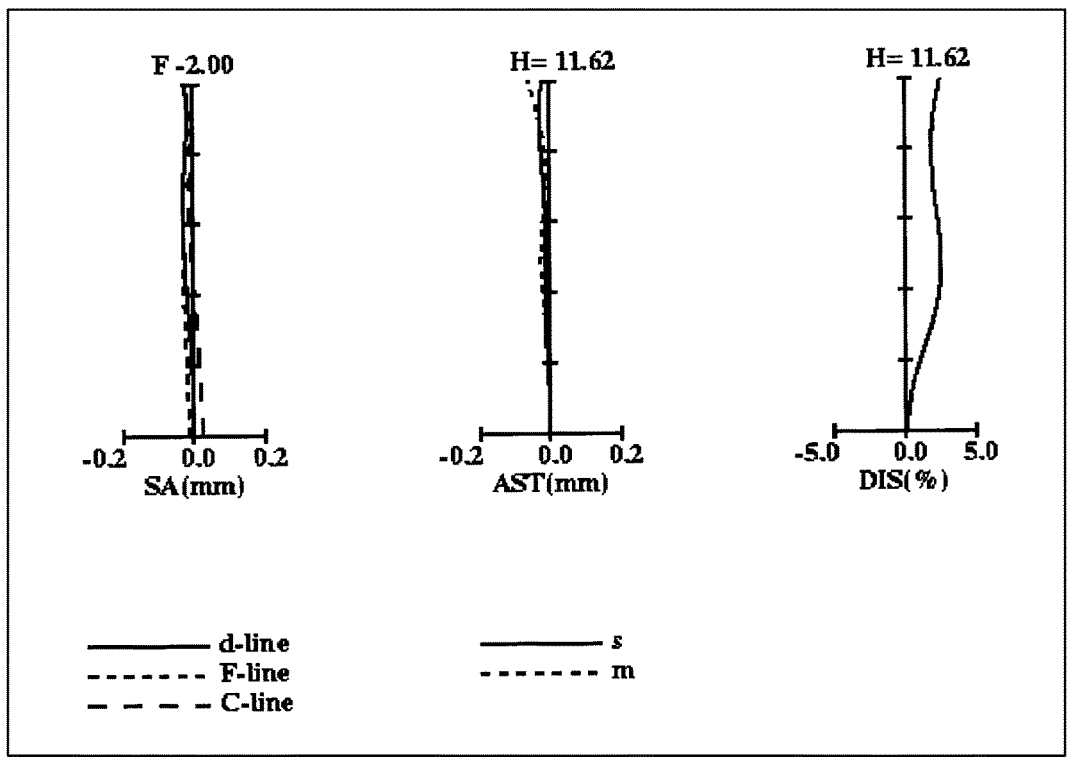
FIG. 20 is a longitudinal aberration diagram of the zoom lens system of example 4 for an object distance of 600 mm.
Figure 21:
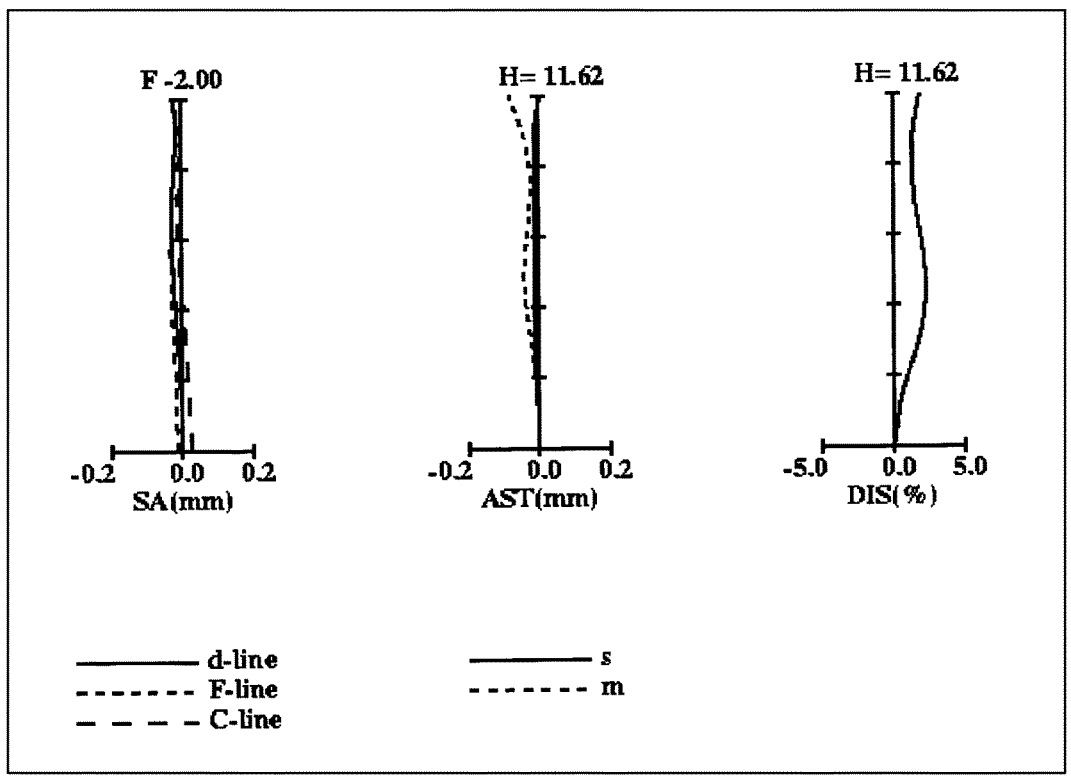
FIG. 21 is a longitudinal aberration diagram of the zoom lens system of example 4 for an object distance of 2400 mm.

FIGS. 2, 7, 12, and 17 are layout diagrams each showing an optical path at a wide-angle end in a lens system according to any of examples 1 to 4 for an object distance of 900 mm. FIGS. 3, 8, 13 and 18 are layout drawings of the lens system according to examples 1 to 4 for an object distance of 900 mm. FIGS. 3(a), 8(a) and 13(a) are lens arrangement diagrams at the wide-angle end in the zoom lens system. FIGS. 3(b), 8(b) and 13(b) are lens arrangement diagrams at an intermediate position in the zoom lens system. FIGS. 3(c), 8(c) and 13(c) are lens arrangement diagrams at a telephoto end in the zoom lens system.

Each lens system has states of the wide-angle end, the intermediate position, and the telephoto end. The wide-angle end is defined as the shortest focal length state in which the entire optical system has the shortest focal length fw. The intermediate position is defined as an intermediate focal length state between the wide-angle end and the telephoto end. The telephoto end is defined as the longest focal length state in which the entire optical system has the longest focal length ft. By using the focal length fw at the wide-angle end and the focal length ft at the telephoto end, the focal length fm at the intermediate position can be defined as fm=√(fw× ft) (√: square root).

The lens system according to example 1 includes a first lens group G1 to a fourth lens group G4. The first lens group G1 is constituted of a first lens element L1 to a 16th lens element L16, including a surface 1 to a surface 32 (for surface numbers, see the numerical examples described later). The second lens group G2 is constituted of a 17th lens element L17 to a 19th lens element L19, including a surface 33 to a surface 38. The third lens group G3 is constituted of a 20th lens element L20 to a 23rd lens element L23, and has a surface 39 to a surface 47. The fourth lens group G4 is constituted of a 24th lens element L24 to 26th lens element L26, including a surface 48 to a surface 53. An optical element P is constituted of optical elements P1, P2, including a surface 54 to a surface 57.

The lens system according to examples 2 to 4 includes a first lens group G1 to a fifth lens group G5. The first lens group G1 is constituted of a first lens element L1 to a 16th lens element L16, including a surface 1 to a surface 32. The second lens group G2 is constituted of a 17th lens element L17 to a 19th lens element L19, including a surface 33 to a surface 38. The third lens group G3 is constituted of a 20th lens element L20 to a 23rd lens element L23, including a surface 39 to a surface 47. The fourth lens group G4 is constituted of a 24th lens element L24, including a surface 48 and a surface 49. The fifth lens group G5 is constituted of a 25th lens element L25, a twenty-sixth lens element L26, and an optical elements P1, P2, including a surface 50 to a surface 57.

In the zoom lens systems according to examples 1 to 3, the first lens group G1 to the fifth lens group G5 can be fixed or moved independently of each other during zooming. The symbols (+) and (−) attached to the reference numerals of the respective lens groups G1 to G5 indicate the positive or negative power of each of the lens groups G1 to G5. Polygonal line arrows shown between each of FIGS. 3(a), 8(a) and 13(a) and each of FIGS. 3(b), 8(b) and 13(b) include straight lines obtained by connecting the positions of the first lens group G1 to the fifth lens group G5 corresponding to each of the states of the wide-angle end, the intermediate position, and the telephoto end ranked in order from the top in the drawing. The wide-angle end and the intermediate position, and the intermediate position and the telephoto end are simply connected by a straight line, which is different from the actual movement of each of the lens groups G1 to G5. The first lens group G1 to the fifth lens group G5 can be each driven by a corresponding lens drive mechanism (not shown) and adjusted in position along the optical axis.

The lens drive mechanism may be made up of a motor, an actuator, a cam, a deceleration mechanism, and the like, and may be configured to be manually operable by a user.

The lens systems according to examples 1 to 4 include a focus lens group FG1 that adjusts the focus when an object distance is changed, and a field curvature correction lens group FG2 that corrects the field curvature aberration after focus adjustment by the focus lens group FG1. The focus lens group FG1 is constituted of, in order from the magnification side to the reduction side, the first lens element L1 to the 11th lens element L11, and the field curvature correction lens group FG2 is constituted of the first lens element L1. During focusing, the focus lens group FG1 can move along the optical axis. The focus lens group FG1 moves toward the magnification side when a projection distance is changed from the far side to the near side. During correcting of the field curvature aberration at a magnification conjugate point on the magnification side, the field curvature correction lens group FG2 can move along the optical axis. The field curvature correction lens group FG2 moves toward the reduction side when the projection distance is changed from the far side to the near side.

Furthermore, the lens systems according to examples 1 to 4 include the flange back distance correction lens group FBG for use in correction of an error in the flange back distance of the lens system with respect to the image forming surface Q1, as described with reference to FIG. 1. The flange back distance correction lens group FBG includes the 14th lens element L14 and the 15th lens element L15 in order from the magnification side to the reduction side. During the correction of the flange back distance error, the flange back distance correction lens group FBG can move along the optical axis.

In order to correct the flange back distance error, the entire lens system may be assumed to move in an optical axis direction, but a movable weight becomes larger. Alternatively, the 24th lens element L24, the 25th lens element L25, and the 26th lens element L26 according to example 1, and the 25th lens element L25 and the 26th lens element L26 according to examples 2 to 4 may be assumed to move in the optical axis direction, but it is not preferable because such lens elements are positioned to enter the apparatus body 105.

It is preferable that some lenses located close to the intermediate imaging position be moved.

In each of the drawings, an imaging position on the magnification side (i.e., the magnification conjugate point) is located on the left side, and an imaging position on the reduction side (i.e., the reduction conjugate point) is located on the right side. Further, in each of the drawings, the straight line drawn closest to the reduction side represents a position of the original image S, and an optical element P is located on the magnification side of the original image S. The position of the original image S corresponds to the image forming surface Q1 shown in FIG. 1. The optical element P represents different optical elements, such as a prism for color separation and color synthesis, an optical filter, a flat-parallel glass plate, a crystal low-pass filter, and an infrared cut filter.

The lens system according to the examples 1 to 4 internally has an intermediate imaging position MI that is conjugated to the magnification conjugate point on the magnification side and the reduction conjugate point on the reduction side, respectively. Further, in each of the drawings, a magnification optical system Op is positioned on the magnification side with respect to the intermediate imaging position MI, and a relay optical system Ol is positioned on the reduction side with respect to the intermediate imaging position MI.

FIGS. 4, 9, 14 and 19 are longitudinal aberration diagrams of the lens system according to examples 1 to 4 for an object distance of 900 mm. FIGS. 5, 10, 15 and 20 are longitudinal aberration diagrams of the lens system according to examples 1 to 4 for an object distance of 600 mm. FIGS. 6, 11, 16 and 21 are longitudinal aberration diagrams of the lens according to examples 1 to 4 for an object distance of 2400 mm. FIGS. 4(a) to 6(a), 9(a) to 11(a), 14(a) to 16(a) show longitudinal aberration diagrams at the wide-angle end of the zoom lens system, and FIGS. 4(b) to 6(b), 9(b) to 11(b), 14(b) to 16(b) show longitudinal aberration diagrams at the intermediate position, and FIGS. 4(c) to 6(c), 9(c) to 11(c), 14(c) to 16(c) show longitudinal aberration diagrams at the telephoto end.

Each of the longitudinal aberration diagrams shows spherical aberration (SA (mm)), astigmatism (AST (mm)), and distortion (DIS (%)) in order from the left side. In the spherical aberration diagram, the vertical axis represents an F number (indicated by F in the drawing), and a solid line shows the characteristic of the d-line, a short dashed line shows the characteristic of the F-line, and a long dashed line shows the characteristic of the C-line. In the astigmatism diagram, the vertical axis represents an image height, and a solid line shows the characteristic of the sagittal plane (indicated by s in the drawing), and a dashed line shows the characteristic of the meridional plane (indicated by m in the drawing). In the distortion diagram, the vertical axis represents the image height. The distortion represents distortion with respect to equidistant projection.

EXAMPLE 1

Figure 2:
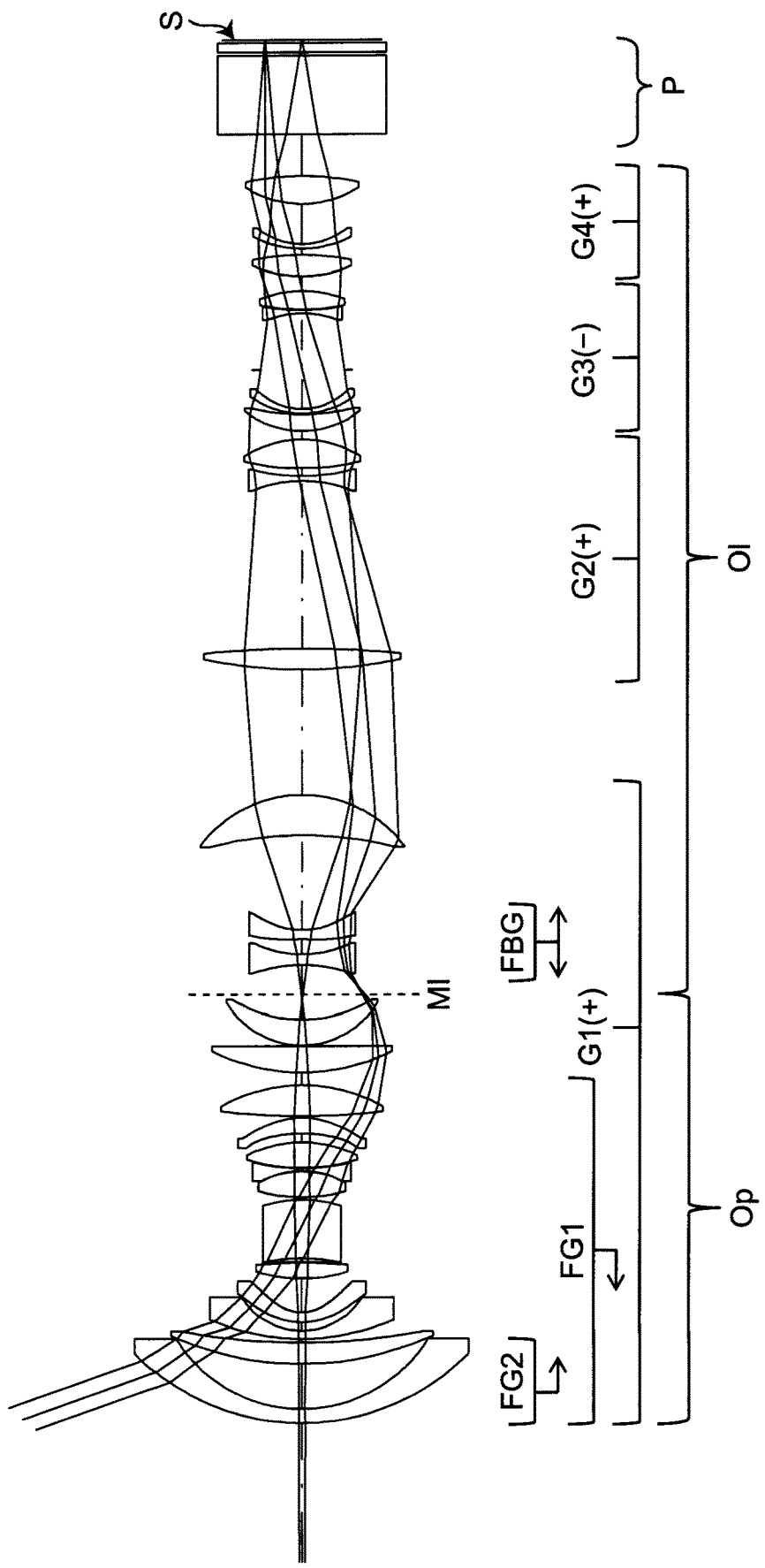
FIG. 2 is a layout diagram showing an optical path at a wide-angle end in a zoom lens system of example 1 for an object distance of 900 mm.
Figure 3:
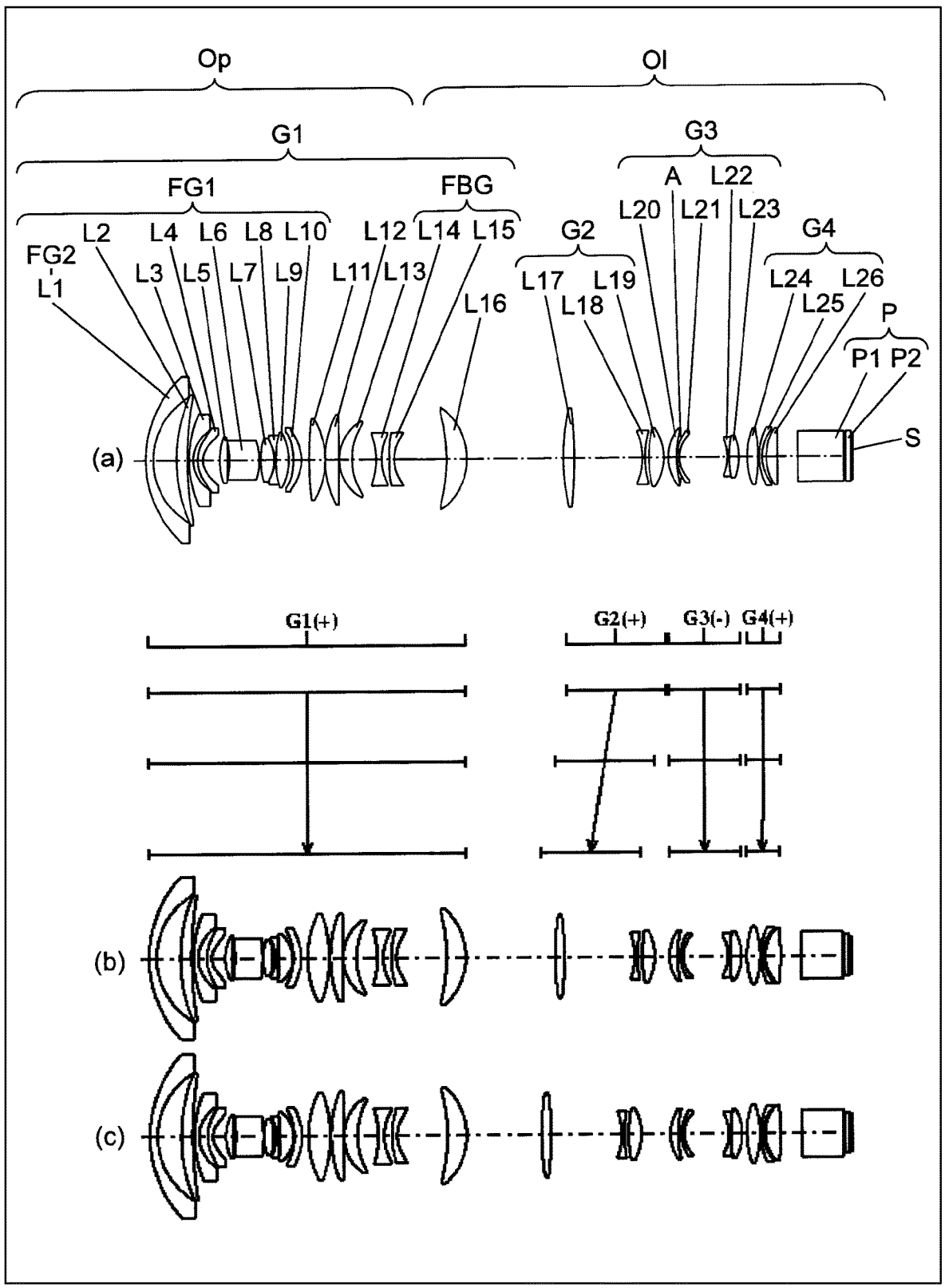
FIG. 3 is a layout diagram of the zoom lens system of example 1 for an object distance of 900 mm.
Figure 4:
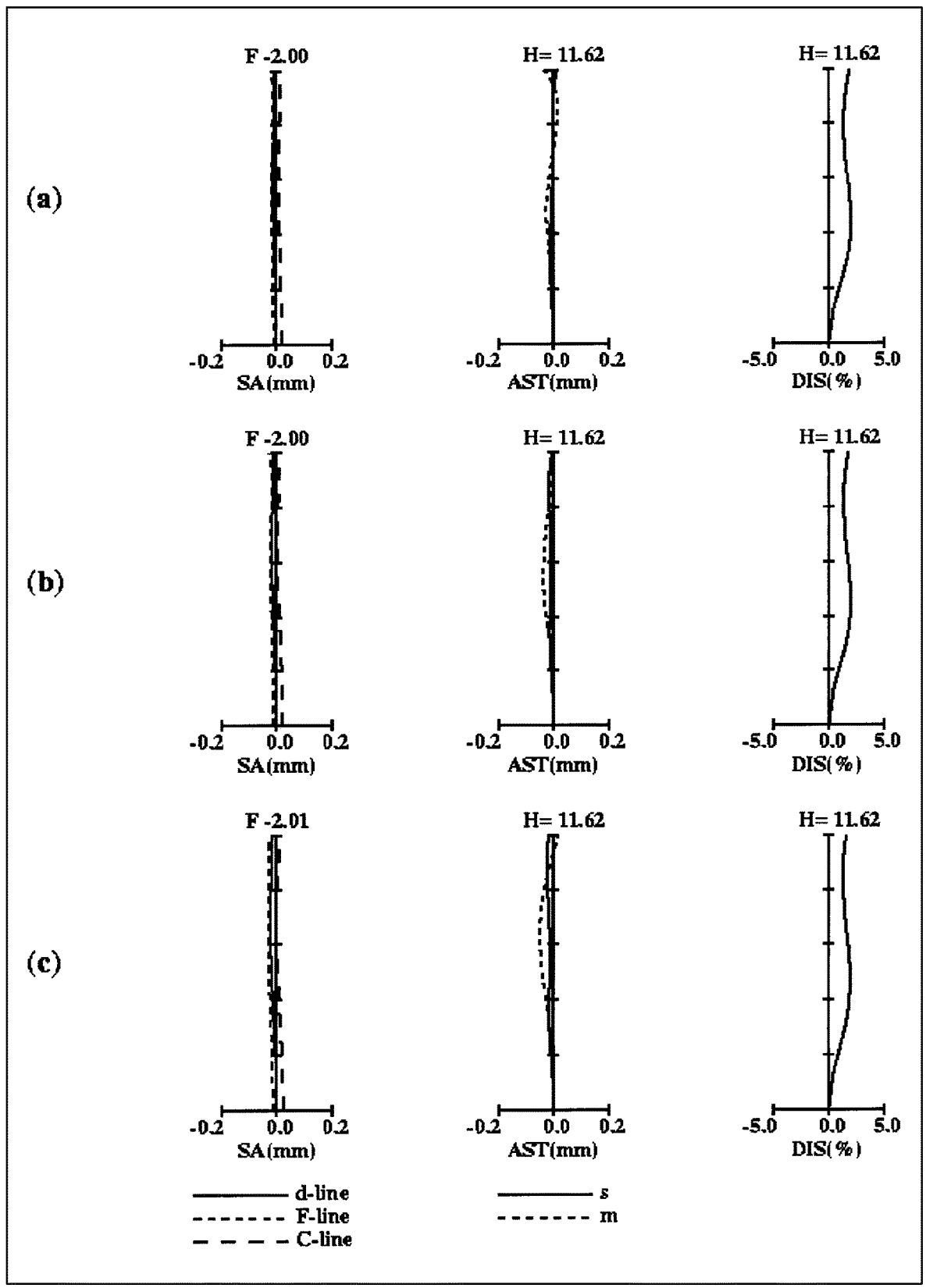
FIG. 4 is a longitudinal aberration diagram of the zoom lens system of example 1 for an object distance of 900 mm.
Figure 5:
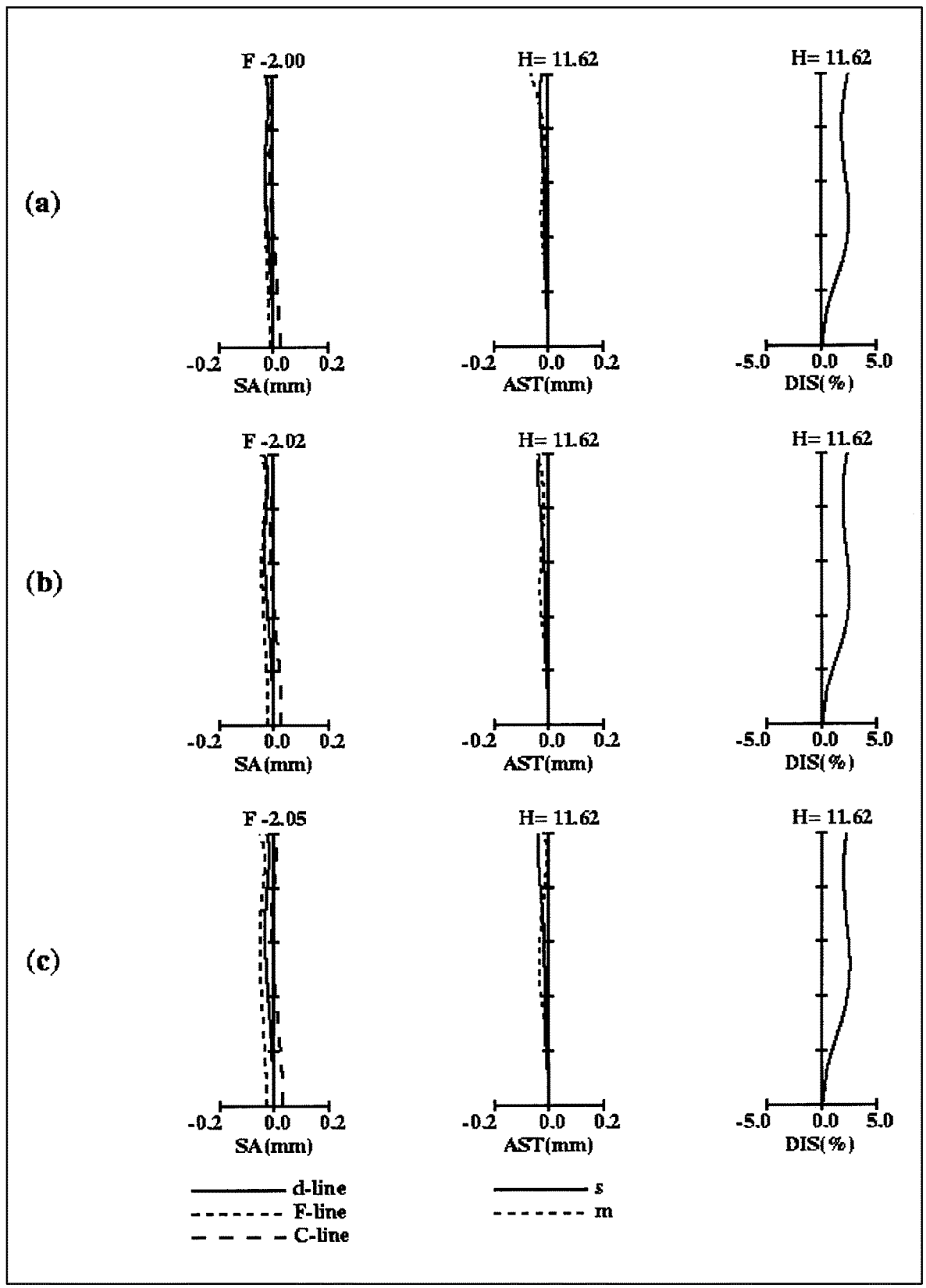
FIG. 5 is a longitudinal aberration diagram of the zoom lens system of example 1 for an object distance of 600 mm.
Figure 6:
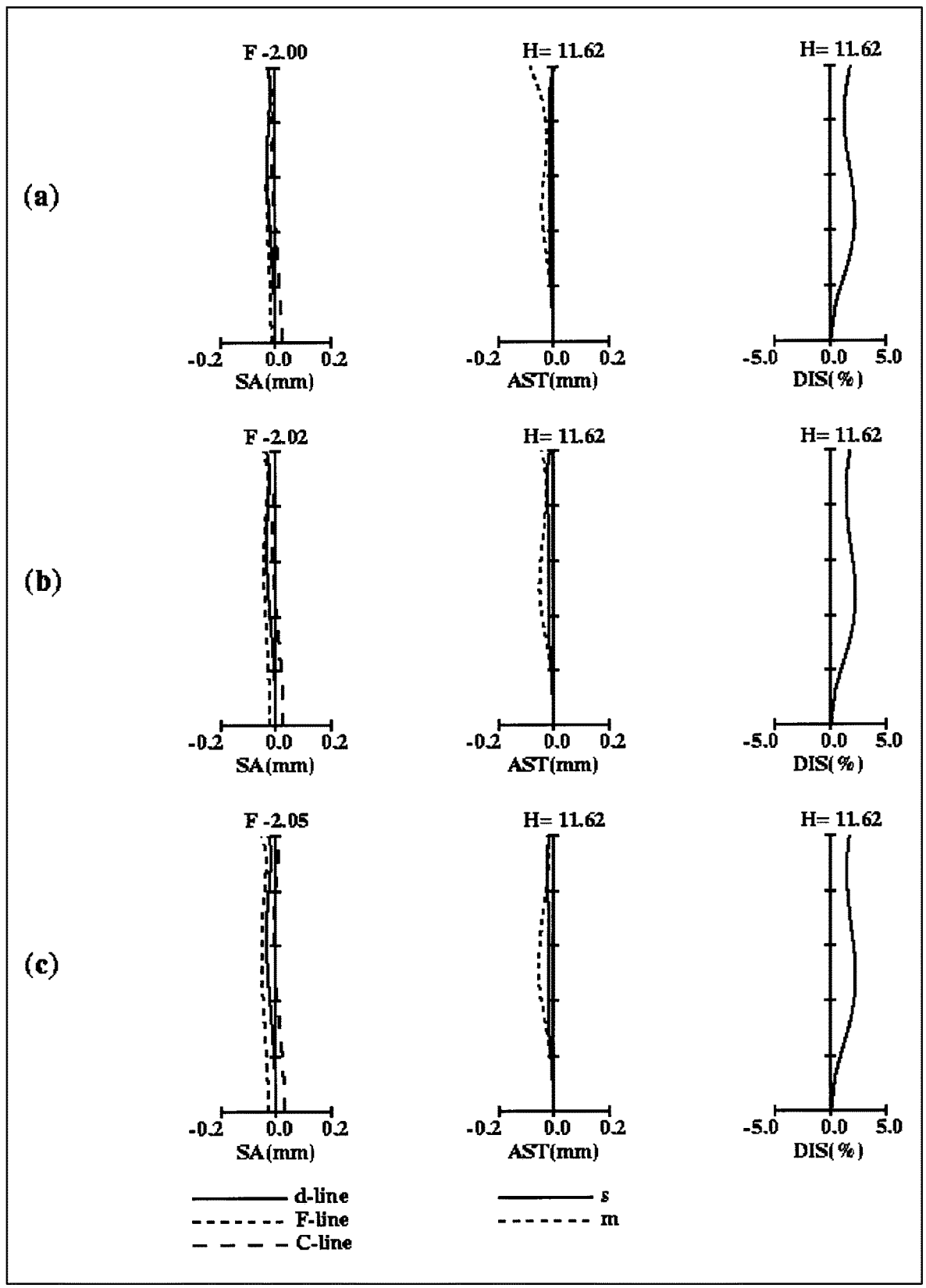
FIG. 6 is a longitudinal aberration diagram of the zoom lens system of example 1 for an object distance of 2400 mm.
Figure 7:
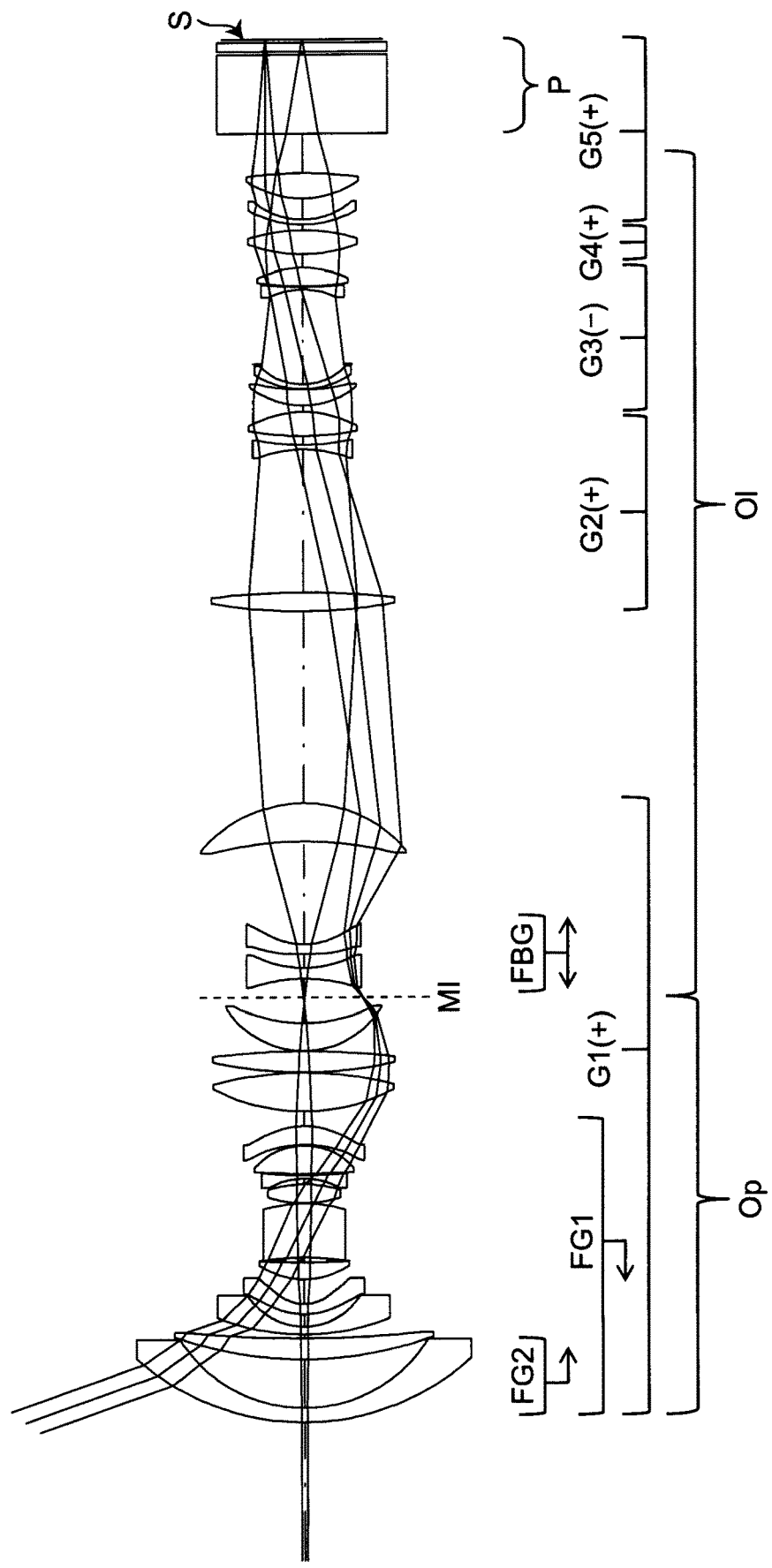
FIG. 7 is a layout diagram showing an optical path at a wide-angle end in a zoom lens system of example 2 for an object distance of 900 mm.

As shown in FIGS. 2 and 3, the lens system according to the example 1 includes the magnification optical system Op and the relay optical system Ol. The magnification optical system Op includes the focus lens group FG1, the field curvature correction lens group FG2 and a part of the first lens group G1. The relay optical system Ol includes the rest of the first lens group G1, the second lens group G2 to the fourth lens group G4 in this order from the magnification side to the reduction side.

The focus lens group FG1 is constituted of the first lens element L1 to the 10th lens element L10 in this order from the magnification side to the reduction side, including a surface 1 to a surface 20. The first lens element L1 has a negative meniscus shape with the convex surfaces facing the magnification side. The second lens element L2 has a positive meniscus shape with the convex surfaces facing the magnification side. The third lens element L3 has a negative meniscus shape with the convex surfaces facing the magnification side. The fourth lens element L4 has a negative meniscus shape with the convex surfaces facing the magnification side. The fifth lens element L5 has a positive meniscus shape with the convex surfaces facing the magnification side. The sixth lens element L6 has a positive meniscus shape with the convex surfaces facing the reduction side. The seventh lens element L7 has a biconvex shape. The eighth lens element L8 has a biconcave shape. The ninth lens element L9 has a positive meniscus shape with the convex surfaces facing the reduction side. The 10th lens element L10 has a positive meniscus shape with the convex surfaces facing the reduction side.

The field curvature correction lens group FG2 is constituted of the first lens element L1 and the second lens element L2.

The part of the first lens group G1 belonging to the magnification optical system Op is constituted of the 11th lens element L11 to the 13th lens element L13 in order from the magnification side to the reduction side, including a surface 21 to a surface 26. The 11th lens element L11 has a biconvex shape. The 12th lens element L12 has a biconvex shape. The 13th lens element L13 has a positive meniscus shape with the convex surfaces facing the magnification side.

The rest of the first lens group G1 belonging to the relay optical system Ol is constituted of the 14th lens element L14 to the 16th lens element L16 in order from the magnification side to the reduction side, including a surface 27 to a surface 32. The 14th lens element L14 has a biconcave shape. The 15th lens element L15 has a negative meniscus shape with the convex surfaces facing the magnification side. The 16th lens element L16 has a positive meniscus shape with the convex surfaces facing the reduction side. The 14th lens element L14 and the 15th lens element L15 constitute the flange back distance correction lens group FBG.

The second lens group G2 is constituted of the 17th lens element L17 to the 19th lens element L19, including a surface 33 to a surface 38. The 17th lens element L17 has a biconvex shape. The 18th lens element L18 has a biconcave shape. The 19th lens element L19 has a biconvex shape.

The third lens group G3 is constituted of the 20th lens element L20 to the 23th lens element L23, including a surface 39 to a surface 47. The 20th lens element L20 has a positive meniscus shape with the convex surfaces facing the magnification side. The 21th lens element L21 has a negative meniscus shape with the convex surfaces facing the magnification side. The 22th lens element L22 has a biconcave shape. The 23th lens element L23 has a biconvex shape.

The fourth lens group G4 is constituted of the 24th lens element L24 to the 26th lens element L26, including a surface 48 to a surface 53. The 24th lens element L24 has a biconvex shape. The 25th lens element L25 has a negative meniscus shape with the convex surfaces facing the magnification side. The 26th lens element L26 has a biconvex shape.

The intermediate imaging position MI is located between the 13th lens element L13 and the 14th lens element L14.

Further, an aperture A is arranged between the 20th lens element L20 and the 21st lens element L21. The optical elements P1 and P2 having zero optical power are arranged on the reduction side of the relay optical system Ol, and these optical elements correspond to the optical element P.

EXAMPLES 2 TO 4

Examples 2 to 4 exemplify lens systems further including a fifth lens group G5. Specifically, as shown in FIGS. 7, 8, 12, 13, 17 and 18, the lens systems according to examples 2 to 4 each include such first lens element L1 to the 26th lens element L26 as described in example 1, but the fourth lens group G4 according to example 1 is divided into the fourth lens group G4 according to examples 2 to 4 including the 24th lens element L24 and the fifth lens group G5 according to examples 2 to 4 including the 25th lens element L25, the 26th lens element L26 and the optical elements P1, P2.

The structures of the magnification optical system Op and the relay optical system Ol, the structures of the focus lens group FG1 and the field curvature correction lens group FG2, the shapes of the first lens element L1 to the 26th lens element L26, and the structures of the optical elements P1, P2 are the same as those according to example 1, and thus no duplicate description will be given below. In a manner similar to example 1, the 14th lens element L14 and the 15th lens element L15 constitute the flange back distance correction lens group FBG.

The lens system according to examples 1 to 4 may include not only lens elements having an optical power but also elements having zero or substantially zero optical power, such as mirrors, apertures, masks, cover glasses, filters, prisms, wave plates, and polarizing elements.

OUTLINE OF EXAMPLES 1 TO 4

The lens system according to examples 1 to 4 internally has an intermediate imaging position MI that is conjugated to the magnification conjugate point on the magnification side and the reduction conjugate point on the reduction side, respectively. Further, the lens system according to examples 1 to 4 includes the magnification optical system Op constituted of the plurality of lens elements, positioned on the magnification side with respect to the intermediate imaging position MI, and the relay optical system Ol constituted of the plurality of lens elements, positioned on the reduction side with respect to the intermediate imaging position MI. In a case the intermediate imaging position MI is located inside a lens element, the lens group located on the magnification side of that lens element belongs to the magnification optical system Op, and the lens group located on the reduction side of the lens element located at the intermediate imaging position belongs to the relay optical system Ol. When forming an intermediate imaging of the original image by means of the relay optical system Ol, it becomes easy to correct various aberrations, in particular, chromatic aberration of magnification and the like.

The lens system according to the present embodiment may be configured as an interchangeable lens detachably attached to a apparatus body, such as an image projection apparatus or an imaging apparatus, which will be described later. In this case, the lenses for adjusting an amount of curvature of field at the magnification conjugate point on the magnification side, such as the first lens element L1 and the second lens element L2, are configured to be adjustable in position in the optical axis direction after being attached to the apparatus body.

Next, conditions which the lens system according to the present embodiment can satisfy will be described below. Although a plurality of the conditions are defined for the lens system according to each of the examples, all of these plurality of conditions may be satisfied, or the individual conditions may be satisfied to obtain the corresponding effects.

The lens system according to the present embodiment is an interchangeable lens that can be detachably attached to the apparatus body 105 having the image forming surface Q1 on which an image is formed, and the interchangeable lens has the magnification conjugate point on the magnification side and the reduction conjugate point on the reduction side. The interchangeable lens may include the focus lens group FG1 that can move along the optical axis to adjust a focus at the magnification conjugate point and the flange back distance correction lens group FBG that can move along the optical axis to correct an error in the flange back distance of the interchangeable lens with respect to the image forming surface Q1.

In general, for an ultra-short focus lens, adjustment using the focus lens group to eliminate the flange back distance error of the apparatus body may generate relatively large curvature of field. In this regard, the interchangeable lens according to the present embodiment is capable of correcting the flange back distance error of the apparatus body by using the flange back distance correction lens group FBG. This can reduce an impact of the flange back distance error while suppressing the occurrence of curvature of field.

Further, in the lens system according to the present embodiment, the flange back distance correction lens group FBG may be adjusted in position after the interchangeable lens is attached to the apparatus body.

According to such a structure, since a flange back distance error may be varied among the respective apparatus bodies, adjusting the position of the flange back distance correction lens group FBG after the interchangeable lens is attached to the apparatus body allows for the adjustment to the flange back distance for the respective apparatus bodies.

Further, the lens system according to the present embodiment may satisfy the following condition (1):

$$0.15 < |\{1-(\beta bw^2)\} \times (\beta brw^2)| < 1.40 \quad (1)$$

where $\beta bw$ is a paraxial lateral magnification at the wide-angle end, of the flange back distance correction lens group FBG, and $\beta brw$ is a paraxial lateral magnification at the wide-angle end, of all lenses positioned on the reduction side with respect to the flange back distance correction lens group FBG.

The condition (1) is a conditional expression for representing focus sensitivity of the flange back distance correction lens FBG. When satisfying this condition, the flange back distance can be easily adjusted. If falling below the lower limit of the condition (1), other aberrations, such as curvature of field, may occur during adjustment of the flange back distance. On the other hand, if exceeding the upper limit, the sensitivity of adjustment of the flange back distance becomes too high, thereby making the adjustment difficult.

In addition to the condition (1), more advantageous effects can be obtained by further satisfying at least one of the following conditions (1A) and (1B):

$$|\{1-(\beta bw^2)\} \times (\beta brw^2)| > 0.20 \quad (1A)$$

$$|\{1-(\beta bw^2)\} \times (\beta brw^2)| < 1.20 \quad (1B)$$

The lens system according to the present embodiment may satisfy the following condition (2):

$$0.1 < |\{1-(\beta f w^2)\} \times (\beta f r w^2)| < 0.15 \quad (2)$$

where βfw is a paraxial lateral magnification at the wide-angle end, of the focus lens group FG1, and βfrw is a paraxial lateral magnification at the wide-angle end, of all lenses positioned on reduction side with respect to the focus lens group FG1.

The condition (2) is a conditional expression for representing focus sensitivity of the focus lens group FG1. When satisfying this condition, the focus can be easily adjusted. If falling below the lower limit of the condition (2), an amount of movement of the focus lens group FG1 increases when the projection distance is changed during the focus adjustment, thereby causing excessive curvature of field or the like. On the other hand, if exceeding the upper limit, an amount of movement of the focus lens group FG1 becomes too small when the projection distance is changed, thereby insufficiently correcting curvature of field.

In addition to the condition (2), more advantageous effects can be obtained by further satisfying at least one of the following conditions (2A) and (2B):

$$|\{1-(\beta f w^2)\} \times (\beta f r w^2)| > 0.02 \quad (2A)$$

$$|\{1-(\beta f w^2)\} \times (\beta f r w^2)| < 0.05 \quad (2B)$$

Further, the lens system according to the present embodiment further includes the field curvature correction lens group FG2 that can move along the optical axis to correct an amount of curvature of field at the magnification conjugate point and may satisfy the following condition (3):

$$|\{1-(\beta c w^2)\} \times (\beta c r w^2)| < 0.01 \quad (3)$$

where βcw is a paraxial lateral magnification at the wide-angle end, of the field curvature correction lens group FG2, and βcrw is a paraxial lateral magnification at the wide-angle end, of all lenses positioned on the reduction side with respect to the field curvature correction lens group FG2.

The condition (3) is a conditional expression for representing focus sensitivity of the field curvature correction lens group FG2. When satisfying this condition, the curvature of field can be easily adjusted. If exceeding the upper limit of the condition (3), the focus position is changed when the field curvature correction lens group FG2 is moved, thereby requiring additional adjustment using the focus lens group FG1.

In addition to the condition (3), more advantageous effects can be obtained by further satisfying at least one of the following condition (3A):

$$|\{1-(\beta c w^2)\} \times (\beta c r w^2)| < 0.001 \quad (3A)$$

Further, the lens system according to the present embodiment may include the magnification optical system Op having the plurality of lens elements, positioned on the magnification side with respect to the intermediate imaging position MI and may satisfy the following condition (4):

$$1 < ff/fw < 3 \quad (4)$$

where fw is a focal length of the entire optical system at the wide-angle end, and ff is a focal length of the magnification optical system Op.

The condition (4) is a conditional expression for defining the relationship between the focal length of the magnification optical system Op and the focal length of the entire optical system at the wide-angle end. When satisfying this condition, a good wide-angle zoom lens can be realized. If exceeding the upper limit, the wide-angle lens is difficult to manufacture. On the other hand, if falling below the lower limit, the chromatic aberration of magnification becomes large and good image quality cannot be obtained.

Further, the lens system according to the present embodiment may include the relay optical system Ol having the plurality of lens elements, positioned on the reduction side with respect to the intermediate imaging position MI and may satisfy the following condition (5):

$$2 < fr/fw < 4 \quad (5)$$

where fw is a focal length of the entire optical system at the wide-angle end, and fr is a focal length of the relay optical system Ol at the wide-angle end.

The condition (5) is a conditional expression for defining the relationship between the focal length of the relay optical system Ol and the focal length of the entire optical system at the wide-angle end. When satisfying this condition, a compact lens system can be realized. If exceeding the upper limit, the total length of the lens system increases. On the other hand, if falling below the lower limit, it is difficult to secure back focus.

Further, the lens system according to the present embodiment may satisfy the following condition (6):

$$5 < fb/fw < 30 \quad (6)$$

where fw is a focal length of the entire optical system at the wide-angle end, and fb is a back focus of the entire optical system.

The condition (6) is a conditional expression for defining the relationship between the back focus of the entire optical system and the focal length of the entire optical system at the wide-angle end. When satisfying this condition, a compact lens system can be realized. If exceeding the upper limit, the total length of the lens system increases. On the other hand, if falling below the lower limit, it is difficult to dispose the optical element P, such as prism, between the lens system and the original image S.

The lens system according to the present embodiment may satisfy the following condition (7):

$$|\omega| > 60 \quad (7)$$

where, ω is a maximum half angle of view at the wide-angle end.

The condition (7) is a conditional expression for defining the maximum half angle of view at the wide-angle end. When satisfying this condition, the distance from the lens system to the magnification conjugate point on the magnification side can be shortened. If falling below the lower limit, the projection distance increases, thereby generating curvature of field.

Further, the lens system according to the present embodiment may internally have an intermediate imaging position MI that is conjugated to the magnification conjugate point on the magnification side and the reduction conjugate point on the reduction side, respectively.

According to this structure, the wide-angle lens is easy to manufacture, and correction of various optical aberrations, particularly chromatic aberration of magnification, can be easily made.

As described above, some examples have been described to exemplify the technology disclosed in the present application. The technology of the present disclosure, however, is not limited only to these examples, but also can be applied to other embodiments appropriately devised through modification, substitution, addition, omission and so on.

Hereinafter, numerical examples of the lens system according to examples 1 to 4 are described. In each of the numerical examples, in the table, the unit of length is all "mm", and the unit of angle of view is all "°" (degree). Further, in each of the numerical examples, r is a radius of curvature, d is a surface interval, nd is a refractive index for d line, and vd is an Abbe number for d line. Further, in each of the numerical examples, a surface marked with "*" is aspherical, and the aspherical shape is defined by the following formula.

[Mathematical Formula 1]

$$Z = \frac{h^2/r}{1 + \sqrt{1 - (1+\kappa)(h/r)^2}} + \sum A_n h^n$$

where, Z is a distance from a point located on an aspherical surface at a height "h" from the optical axis, to the tangent plane of the aspherical vertex, h is a height from the optical axis, r is a radius of curvature of the vertex, K is a cone constant, and An is a nth-order aspherical coefficient.

NUMERICAL EXAMPLE 1

Regarding the lens system of numerical example 1 (corresponding to example 1), Table 1 shows surface data, Table 2 shows various data, Table 3 shows single lens data, and Table 4 shows zoom lens group data.

TABLE 1

Surface data

| SURFACE NUMBER | r | d | nd | vd |
|---|---|---|---|---|
| Object plane | ∞ (infinity) | | | |
| 1 | 74.92620 | 4.50000 | 1.90366 | 31.3 |
| 2 | 45.58550 | 14.51120 | | |
| 3 | 100.16420 | 7.02680 | 1.72342 | 38.0 |
| 4 | 245.48610 | 1.20000 | | |
| 5 | 75.41730 | 2.50000 | 1.80420 | 46.5 |
| 6 | 21.49530 | 5.33740 | | |
| 7* | 23.41890 | 3.20000 | 1.80998 | 40.9 |
| 8* | 11.47990 | 7.97790 | | |
| 9 | 26.95480 | 5.05830 | 1.80610 | 33.3 |
| 10 | 372.52000 | 1.29850 | | |
| 11 | −75.37440 | 16.78600 | 1.61800 | 63.4 |
| 12 | −41.68720 | 0.20000 | | |
| 13 | 34.61930 | 5.85470 | 1.49700 | 81.6 |
| 14 | −45.96970 | 1.57640 | | |
| 15 | −25.62730 | 1.00000 | 1.86966 | 20.0 |
| 16 | 103.19010 | 1.13000 | | |
| 17 | −450.91150 | 8.65430 | 1.49700 | 81.6 |
| 18 | −19.49540 | 0.20000 | | |
| 19* | −36.69630 | 5.07730 | 1.68948 | 31.0 |
| 20* | −25.00000 | 3.73430 | | |
| 21 | 61.92940 | 13.56150 | 1.49700 | 81.6 |
| 22 | −75.70850 | 0.30520 | | |
| 23 | 76.43730 | 7.44970 | 1.92286 | 20.9 |
| 24 | −1979.87550 | 0.20000 | | |
| 25 | 27.80820 | 8.49730 | 1.92286 | 20.9 |
| 26 | 45.59460 | 12.73380 | | |
| 27 | −59.31690 | 3.50000 | 1.80809 | 22.8 |
| 28 | 31.30820 | 5.16610 | | |
| 29* | 500.00000 | 3.00000 | 1.68948 | 31.0 |
| 30* | 21.70330 | 30.56180 | | |
| 31 | −112.56610 | 12.07660 | 1.83481 | 42.7 |
| 32 | −39.63550 | variable | | |
| 33 | 176.79960 | 5.66550 | 1.80610 | 33.3 |
| 34 | −203.16700 | 43.21200 | | |
| 35 | −40.25350 | 1.50000 | 1.73800 | 32.3 |

TABLE 1-continued

| | | | | |
|---|---|---|---|---|
| 36 | 67.69060 | 2.91820 | | |
| 37 | 86.15860 | 7.77120 | 1.55032 | 75.5 |
| 38 | −33.81080 | variable | | |
| 39 | 26.28560 | 4.93260 | 1.59270 | 35.4 |
| 40 | 61.96710 | 1.90440 | | |
| 41(Aperture) | ∞ | 0.20000 | | |
| 42 | 25.84350 | 1.50000 | 1.56883 | 56.0 |
| 43 | 17.79290 | 28.01770 | | |
| 44 | −24.41420 | 1.00000 | 1.73800 | 32.3 |
| 45 | 708.75310 | 0.20120 | | |
| 46 | 134.51110 | 6.70790 | 1.43700 | 95.1 |
| 47 | −29.75710 | variable | | |
| 48 | 52.54990 | 8.16940 | 1.49700 | 81.6 |
| 49 | −52.54990 | 0.20000 | | |
| 50 | 39.20320 | 1.50000 | 1.73800 | 32.3 |
| 51 | 22.63510 | 1.47190 | | |
| 52 | 24.59820 | 9.17900 | 1.43700 | 95.1 |
| 53 | −252.19960 | variable | | |
| 54 | ∞ | 25.00000 | 1.58913 | 61.3 |
| 55 | ∞ | 1.00000 | | |
| 56 | ∞ | 3.00000 | 1.50847 | 61.2 |
| 57 | ∞ | 1.00000 | | |
| Image plane | | | | |

Aspherical data

7th surface

K = 0.00000E+00, A4 = −9.25590E−06, A6 = −5.88150E−08, A8 = 2.38914E−11, A10 = 0.00000E+00, A12 = 0.00000E+00

8th surface

K = −8.31100E−01, A4 = −2.05330E−05, A6 = −1.45537E−07, A8 = −2.45145E−10, A10 = 1.48930E−12, A12 = 0.00000E+00

19th surface

K = 0.00000E+00, A4 = 1.67567E−05, A6 = −1.24548E−07, A8 = 2.59137E−10, A10 = −8.49584E−13, A12 = 2.12524E−15

20th surface

K = 0.00000E+00, A4 = 3.00558E−05, A6 = −1.99833E−08, A8 = −1.05179E−10, A10 = 3.86888E−13, A12 = −2.40991E−17

29th surface

K = 0.00000E+00, A4 = 6.27880E−05, A6 = −1.54311E−07, A8 = 7.71760E−11, A10 = 0.00000E+00, A12 = 0.00000E+00

30th surface

K = 0.00000E+00, A4 = 3.16302E−06, A6 = −1.09572E−07, A8 = 3.14237E−11, A10 = 0.00000E+00, A12 = 0.00000E+00

TABLE 2

Various data (object distance 900 mm)

Zoom ratio 1.07121

| | WIDE-ANGLE | INTERMEDIATE | TELEPHOTO |
|---|---|---|---|
| Focal length | −4.1494 | −4.2815 | −4.4450 |
| F number | −2.00005 | −2.00178 | −2.00512 |
| Angle of view | −70.0082 | −69.4536 | −68.7704 |
| Image height | 11.6200 | 11.6200 | 11.6200 |
| d32 | 61.5007 | 54.5514 | 45.8536 |
| d38 | 2.0000 | 8.9493 | 17.6471 |
| d47 | 3.8730 | 3.4453 | 2.8438 |
| d53 | 12.7000 | 13.1277 | 13.7292 |

Various data object distance 600 mm

| | | | |
|---|---|---|---|
| d4 | 1.0886 | 1.1370 | 1.1974 |
| d20 | 0.7048 | 0.7179 | 0.7526 |

Various data (object distance 2400 mm)

| | | | |
|---|---|---|---|
| d4 | 1.1296 | 1.2797 | 1.2935 |
| d20 | 0.2000 | 0.2564 | 0.2705 |

TABLE 3

Single lens data

| Lens element | First surface | Focal length |
|---|---|---|
| 1 | 1 | −138.9359 |
| 2 | 3 | 229.2415 |
| 3 | 5 | −38.1729 |
| 4 | 7 | −31.5903 |
| 5 | 9 | 35.8128 |
| 6 | 11 | 126.7972 |
| 7 | 13 | 40.7158 |
| 8 | 15 | −23.5207 |
| 9 | 17 | 40.7277 |
| 10 | 19 | 96.6404 |
| 11 | 21 | 70.8588 |
| 12 | 23 | 79.8866 |
| 13 | 25 | 62.8360 |
| 14 | 27 | −24.9285 |
| 15 | 29 | −32.9906 |
| 16 | 31 | 68.1472 |
| 17 | 33 | 118.0592 |
| 18 | 35 | −34.0033 |
| 19 | 37 | 45.1615 |
| 20 | 39 | 73.2508 |
| 21 | 42 | −107.6876 |
| 22 | 44 | −31.9615 |
| 23 | 46 | 56.4598 |
| 24 | 48 | 54.2678 |
| 25 | 50 | −75.4745 |
| 26 | 52 | 51.8089 |

TABLE 4

Zoom lens group data

| Group | First surface | Focal length |
|---|---|---|
| 1 | 1 | 15.71349 |
| 2 | 33 | 181.25798 |
| 3 | 39 | −387.09562 |
| 4 | 48 | 42.00597 |

NUMERICAL EXAMPLE 2

Regarding the lens system of numerical example 2 (corresponding to example 2), Table 5 shows surface data, Table 6 shows various data, Table 7 shows single lens data, and Table 8 shows zoom lens group data.

TABLE 5

Surface data

| SURFACE NUMBER | r | d | nd | vd |
|---|---|---|---|---|
| Object plane | ∞(infinity) | | | |
| 1 | 76.97210 | 4.50000 | 1.90366 | 31.3 |
| 2 | 45.25710 | 15.55330 | | |
| 3 | 118.84520 | 6.57310 | 1.72342 | 38.0 |
| 4 | 362.53170 | 1.20000 | | |
| 5 | 72.78070 | 2.50000 | 1.80420 | 46.5 |
| 6 | 20.94370 | 3.74420 | | |
| 7* | 22.80610 | 3.20000 | 1.80835 | 40.5 |
| 8* | 11.29360 | 7.83580 | | |
| 9 | 25.11650 | 5.27630 | 1.80610 | 33.3 |
| 10 | 211.69580 | 1.33530 | | |
| 11 | −88.92420 | 17.22210 | 1.61800 | 63.4 |
| 12 | −44.60950 | 0.20000 | | |
| 13 | 37.97820 | 5.92810 | 1.49700 | 81.6 |
| 14 | −37.32640 | 1.78920 | | |
| 15 | −22.43200 | 1.00000 | 1.86966 | 20.0 |
| 16 | 107.15730 | 0.52760 | | |
| 17 | 207.94090 | 8.99430 | 1.49700 | 81.6 |
| 18 | −20.59300 | 0.20000 | | |
| 19* | −37.88090 | 6.09100 | 1.68948 | 31.0 |
| 20* | −22.41460 | 4.64090 | | |
| 21 | 58.48790 | 12.39030 | 1.49700 | 81.6 |
| 22 | −111.21090 | 0.20000 | | |
| 23 | 129.73820 | 6.63530 | 1.92286 | 20.9 |
| 24 | −238.79170 | 0.20000 | | |
| 25 | 28.30340 | 8.68620 | 1.92286 | 20.9 |
| 26 | 47.46960 | 14.00080 | | |
| 27 | −52.94980 | 3.50000 | 1.80809 | 22.8 |
| 28 | 35.23110 | 4.32700 | | |
| 29* | 800.00000 | 3.00000 | 1.68948 | 31.0 |
| 30* | 21.53540 | 32.89970 | | |
| 31 | −115.17640 | 12.46080 | 1.83481 | 42.7 |
| 32 | −41.12710 | variable | | |
| 33 | 161.34940 | 6.04980 | 1.80610 | 33.3 |
| 34 | −244.69930 | 45.65730 | | |
| 35 | −39.82210 | 1.50000 | 1.73800 | 32.3 |
| 36 | 71.18550 | 2.90060 | | |
| 37 | 88.54030 | 7.62140 | 1.55032 | 75.5 |
| 38 | −34.19420 | variable | | |
| 39 | 26.13620 | 5.07430 | 1.59270 | 35.4 |
| 40 | 59.24260 | 0.20000 | | |
| 41 | 26.85630 | 1.50000 | 1.56883 | 56.0 |
| 42 | 18.72070 | 6.43990 | | |
| 43(Aperture) | ∞ | 23.42680 | | |
| 44 | −26.36800 | 1.00000 | 1.73800 | 32.3 |
| 45 | 125.55570 | 0.20000 | | |
| 46 | 99.56210 | 5.82430 | 1.43700 | 95.1 |
| 47 | −31.35270 | variable | | |
| 48 | 47.71540 | 7.58850 | 1.49700 | 81.6 |
| 49 | −57.19280 | variable | | |
| 50 | 34.00400 | 1.50000 | 1.73800 | 32.3 |
| 51 | 23.36790 | 6.76910 | | |
| 52 | 30.04680 | 7.97190 | 1.43700 | 95.1 |
| 53 | −141.35140 | 12.70000 | | |
| 54 | ∞ | 25.00000 | 1.58913 | 61.3 |
| 55 | ∞ | 1.00000 | | |
| 56 | ∞ | 3.00000 | 1.50847 | 61.2 |
| 57 | ∞ | 1.00000 | | |
| Image plane | ∞ | | | |

Aspherical data

7th surface

K = 0.00000E+00,  A4 = 7.78300E−07,
A6 = −8.14798E−08,  A8 = 2.54665E−11,
A10 = 0.00000E+00

8th surface

K = −7.80737E−01,  A4 = −7.45302E−06,
A6 = −1.35381E−07,  A8 = −7.07149E−10,
A10 = 2.49573E−12

19th surface

K = 0.00000E+00,  A4 = 3.15412E−06,
A6 = −7.40643E−08,  A8 = −8.73806E−12,
A10 = 5.48746E−13

20th surface

K = 0.00000E+00,  A4 = 2.20679E−05,
A6 = −3.66400E−09,  A8 = −1.01741E−10,
A10 = 4.59590E−13

29th surface

K = 0.00000E +00,  A4 = 6.97301E−05,
A6 = −1.74499E−07,  A8 = 1.02961E−10,
A10 = 0.00000E+00

30th surface

K = 0.00000E+00,  A4 = 5.00921E−06,
A6 = −1.09294E−07,  A8 = 2.35695E−11,
A10 = 0.00000E+00

TABLE 6

Various data (object distance 900 mm)

Zoom ratio 1.06986

| | WIDE-ANGLE | INTERMEDIATE | TELEPHOTO |
|---|---|---|---|
| Focal length | −4.1304 | −4.2879 | −4.4190 |
| F number | −2.00007 | −2.01687 | −2.03286 |
| Angle of view | −70.0348 | −69.3591 | −68.7952 |
| Image height | 11.6200 | 11.6200 | 11.6200 |
| d32 | 61.1058 | 54.0166 | 48.3134 |
| d38 | 2.0813 | 9.1705 | 14.8737 |
| d47 | 4.2775 | 3.4235 | 2.6553 |
| d53 | 2.0000 | 2.8540 | 3.6222 |

Various data (object distance 600 mm)

| | | | |
|---|---|---|---|
| d4 | 1.1311 | 1.1092 | 1.1109 |
| d20 | 4.8408 | 4.8241 | 4.8342 |

Various data (object distance 2400 mm)

| | | | |
|---|---|---|---|
| d4 | 1.2007 | 1.3052 | 1.2917 |
| d20 | 4.3422 | 4.3903 | 4.3789 |

TABLE 7

Single lens data

| Lens element | First surface | Focal length |
|---|---|---|
| 1 | 1 | −130.3270 |
| 2 | 3 | 241.6673 |
| 3 | 5 | −37.3684 |
| 4 | 7 | −31.6034 |
| 5 | 9 | 34.9118 |
| 6 | 11 | 126.1260 |
| 7 | 13 | 38.8934 |
| 8 | 15 | −21.2527 |
| 9 | 17 | 38.2003 |
| 10 | 19 | 68.5987 |
| 11 | 21 | 79.0383 |
| 12 | 23 | 91.8857 |
| 13 | 25 | 62.3892 |
| 14 | 27 | −25.7229 |
| 15 | 29 | −32.1489 |
| 16 | 31 | 71.1776 |
| 17 | 33 | 121.4313 |
| 18 | 35 | −34.4050 |
| 19 | 37 | 45.8342 |
| 20 | 39 | 74.6512 |
| 21 | 41 | −116.4249 |
| 22 | 44 | −29.4455 |
| 23 | 46 | 55.3113 |
| 24 | 48 | 53.6282 |
| 25 | 50 | −107.6787 |
| 26 | 52 | 57.5170 |

TABLE 8

Zoom lens group data

| Group | First surface | Focal length |
|---|---|---|
| 1 | 1 | 15.87199 |
| 2 | 33 | 188.87125 |
| 3 | 39 | −232.69123 |
| 4 | 48 | 53.62820 |
| 5 | 50 | 110.79292 |

NUMERICAL EXAMPLE 3

Regarding the lens system of numerical example 3 (corresponding to example 3), Table 9 shows surface data, Table 10 shows various data, Table 11 shows single lens data, and Table 12 shows zoom lens group data.

TABLE 9

Surface data

| SURFACE NUMBER | r | d | nd | vd |
|---|---|---|---|---|
| Object plane | ∞(infinity) | | | |
| 1 | 75.62400 | 4.50000 | 1.91082 | 35.2 |
| 2 | 45.63740 | 16.84940 | | |
| 3 | 145.28210 | 4.90470 | 1.89070 | 24.6 |
| 4 | 292.36940 | 1.20000 | | |
| 5 | 74.57750 | 2.50000 | 1.78753 | 47.3 |
| 6 | 23.63800 | 3.17880 | | |
| 7* | 23.01440 | 3.20000 | 1.80835 | 40.5 |
| 8* | 11.85380 | 11.93730 | | |
| 9 | 25.64320 | 6.94050 | 1.70937 | 28.8 |
| 10 | 3994.70490 | 2.45890 | | |
| 11 | −45.27330 | 15.96800 | 1.61800 | 63.4 |
| 12 | −64.88530 | 0.20000 | | |
| 13 | 39.47100 | 7.77700 | 1.49700 | 81.6 |
| 14 | −21.78770 | 1.94140 | | |
| 15 | −20.85510 | 1.00000 | 1.86966 | 20.0 |
| 16 | 107.49850 | 0.28250 | | |
| 17 | 123.17670 | 9.51490 | 1.49700 | 81.6 |
| 18 | −24.20570 | 0.20000 | | |
| 19* | −32.08200 | 4.49280 | 1.68948 | 31.0 |
| 20* | −21.63450 | 16.63890 | | |
| 21 | −91.82470 | 10.42000 | 1.49700 | 81.6 |
| 22 | −40.93520 | 0.20000 | | |
| 23 | 145.40240 | 11.55550 | 1.92286 | 20.9 |
| 24 | −114.02890 | 0.20000 | | |
| 25 | 42.49840 | 8.73760 | 1.92286 | 20.9 |
| 26 | 84.81040 | 15.80140 | | |
| 27 | −76.95250 | 2.00000 | 1.80809 | 22.8 |
| 28 | 54.16070 | 1.29900 | | |
| 29* | −77.38370 | 3.00000 | 1.68948 | 31.0 |
| 30* | 25.88420 | 37.28290 | | |
| 31 | −83.70590 | 11.63080 | 1.83481 | 42.7 |
| 32 | −41.04910 | variable | | |
| 33 | 298.26050 | 5.36320 | 1.80610 | 33.3 |
| 34 | −124.21360 | 28.65710 | | |
| 35 | −34.96830 | 1.50000 | 1.73519 | 42.9 |
| 36 | 56.29890 | 3.45450 | | |
| 37 | 73.93030 | 7.04030 | 1.55032 | 75.5 |
| 38 | −30.59210 | variable | | |
| 39 | 26.78100 | 4.29950 | 1.59270 | 35.4 |
| 40 | 81.92060 | 0.20000 | | |
| 41 | 25.89490 | 1.50000 | 1.55954 | 67.9 |
| 42 | 17.52640 | 4.49080 | | |
| 43(Aperture) | ∞ | 17.36970 | | |
| 44 | −25.55020 | 1.00000 | 1.73800 | 32.3 |
| 45 | 114.31840 | 1.60060 | | |
| 46 | 141.78990 | 8.40990 | 1.43700 | 95.1 |
| 47 | −27.11300 | variable | | |
| 48 | 53.99470 | 7.75020 | 1.49700 | 81.6 |
| 49 | −48.34670 | variable | | |
| 50 | 34.14520 | 1.50000 | 1.73800 | 32.3 |
| 51 | 22.48850 | 3.65590 | | |
| 52 | 25.94590 | 8.22330 | 1.43700 | 95.1 |
| 53 | −524.17500 | 12.70000 | | |
| 54 | ∞ | 25.00000 | 1.58913 | 61.3 |
| 55 | ∞ | 1.00000 | | |
| 56 | ∞ | 3.00000 | 1.50847 | 61.2 |
| 57 | ∞ | 1.00000 | | |
| Image plane | ∞ | | | |

Aspherical data

7th surface

K = 0.00000E+00, A4 = 7.11661E−06,
A6 = −6.88598E−08, A8 = 5.23999E−12,
A10 = 0.00000E+00

8th surface

K = −7.63267E−01, A4 = 1.43837E−05,
A6 = −1.11045E−07, A8 = −6.89881E−10,
A10 = 1.61737E−12

TABLE 9-continued

19th surface

K = 0.00000E+00, A4 = 1.15445E−05,
A6 = −6.92582E−08, A8 = −4.01121E−11,
A10 = 2.77038E−13

20th surface

K = 0.00000E+00, A4 = 2.69193E−05,
A6 = 4.33014E−09, A8 = −1.28701E−10,
A10 = 4.32979E−13

29th surface

K = 0.00000E+00, A4 = 7.30983E−05,
A6 = −1.10938E−07, A8 = 4.73473E−11,
A10 = 0.00000E+00

30th surface

K = 0.00000E+00, A4 = 2.43552E−05,
A6 = −8.49789E−08, A8 = 3.15280E−11,
A10 = 0.00000E+00

TABLE 10

Various data (object distance 900 mm)

Zoom ratio  1.07121

|  | WIDE-ANGLE | INTERMEDIATE | TELEPHOTO |
|---|---|---|---|
| Focal length | −4.1300 | −4.2791 | −4.4068 |
| F number | −2.00006 | −2.01154 | −2.02263 |
| Angle of view | −70.0446 | −69.3451 | −68.7397 |
| Image height | 11.6200 | 11.6200 | 11.6200 |
| d32 | 65.4780 | 58.3613 | 52.3679 |
| d38 | 2.0000 | 9.1167 | 15.1101 |
| d47 | 3.9943 | 3.3873 | 2.8249 |
| d53 | 2.0000 | 2.6069 | 3.1694 |

Various data (object distance 600 mm)

| d4 | 1.0822 | 1.1450 | 1.1763 |
| d20 | 16.8188 | 16.8414 | 16.8673 |

Various data (object distance 2400 mm)

| d4 | 1.2773 | 1.2770 | 1.2758 |
| d20 | 16.3805 | 16.3698 | 16.3780 |

TABLE 11

Single lens data

| Lens element | First surface | Focal length |
|---|---|---|
| 1 | 1 | −136.0983 |
| 2 | 3 | 319.2024 |
| 3 | 5 | −44.9151 |
| 4 | 7 | −34.6847 |
| 5 | 9 | 36.3565 |
| 6 | 11 | −351.7629 |
| 7 | 13 | 29.4896 |
| 8 | 15 | −20.0118 |
| 9 | 17 | 41.5964 |
| 10 | 19 | 81.9695 |
| 11 | 21 | 139.1591 |
| 12 | 23 | 70.7641 |
| 13 | 25 | 83.9810 |
| 14 | 27 | −39.0707 |
| 15 | 29 | −27.8022 |
| 16 | 31 | 85.8412 |
| 17 | 33 | 109.4066 |
| 18 | 35 | −29.1372 |
| 19 | 37 | 40.2824 |
| 20 | 39 | 65.2374 |
| 21 | 41 | −103.5845 |
| 22 | 44 | −28.2109 |
| 23 | 46 | 52.8847 |

TABLE 11-continued

Single lens data

| Lens element | First surface | Focal length |
|---|---|---|
| 24 | 48 | 52.6467 |
| 25 | 50 | −94.4195 |
| 26 | 52 | 56.8307 |

TABLE 12

Zoom lens group data

| Group | First surface | Focal length |
|---|---|---|
| 1 | 1 | 19.04268 |
| 2 | 33 | 196.38249 |
| 3 | 39 | −326.79753 |
| 4 | 48 | 52.64669 |
| 5 | 50 | 134.97661 |

NUMERICAL EXAMPLE 4

Regarding the lens system of numerical example 4 (corresponding to example 4), Table 13 shows surface data, Table 14 shows various data, Table 15 shows single lens data.

TABLE 13

Surface data

| SURFACE NUMBER | r | d | nd | vd |
|---|---|---|---|---|
| Object plane | ∞(infinity) | | | |
| 1 | 72.58860 | 4.50000 | 1.90366 | 31.3 |
| 2 | 46.06540 | 14.37540 | | |
| 3 | 98.63210 | 6.74600 | 1.72342 | 38.0 |
| 4 | 209.75020 | 1.20000 | | |
| 5 | 73.42740 | 2.50000 | 1.80420 | 46.5 |
| 6 | 22.51260 | 2.53930 | | |
| 7 | 22.41190 | 3.20000 | 1.80835 | 40.5 |
| 8* | 12.23150 | 10.58270 | | |
| 9 | 47.71610 | 5.00670 | 1.80610 | 33.3 |
| 10 | −166.23420 | 1.19060 | | |
| 11 | −58.28400 | 18.58680 | 1.61800 | 63.4 |
| 12 | −40.57930 | 0.81770 | | |
| 13 | 46.83550 | 8.43230 | 1.49700 | 81.6 |
| 14 | −25.58240 | −0.25790 | | |
| 15 | −29.31310 | 1.00000 | 1.86966 | 20.0 |
| 16 | 58.25650 | 0.20050 | | |
| 17 | 59.04070 | 8.06230 | 1.49700 | 81.6 |
| 18 | −39.10870 | 2.85410 | | |
| 19* | −41.96230 | 5.05690 | 1.68948 | 31.0 |
| 20* | −22.67490 | 0.52130 | | |
| 21 | 223.10310 | 10.00750 | 1.49700 | 81.6 |
| 22 | −50.75420 | 4.14710 | | |
| 23 | 62.67040 | 8.45930 | 1.92286 | 20.9 |
| 24 | −15305.30770 | 0.20000 | | |
| 25 | 27.52730 | 8.06880 | 1.92286 | 20.9 |
| 26 | 40.84890 | 17.18330 | | |
| 27 | −49.92650 | 3.50000 | 1.80809 | 22.8 |
| 28 | 35.53600 | 4.61580 | | |
| 29* | −160.47310 | 3.00000 | 1.68948 | 31.0 |
| 30* | 22.50640 | 30.32270 | | |
| 31 | −113.38490 | 12.91030 | 1.83481 | 42.7 |
| 32 | −39.69070 | variable | | |
| 33 | 143.82470 | 6.67080 | 1.80610 | 33.3 |
| 34 | −322.94740 | 53.39440 | | |
| 35 | −39.78620 | 1.50000 | 1.73800 | 32.3 |
| 36 | 62.62030 | 2.55560 | | |
| 37 | 76.25690 | 9.19960 | 1.55032 | 75.5 |
| 38 | −33.42930 | variable | | |
| 39 | 28.48210 | 5.40920 | 1.59270 | 35.4 |

TABLE 13-continued

| | | | | |
|---|---|---|---|---|
| 40 | 66.92040 | 0.20000 | | |
| 41 | 27.07680 | 1.50000 | 1.56883 | 56.0 |
| 42 | 19.80350 | 12.50060 | | |
| 43(Aperture) | ∞ | 17.91990 | | |
| 44 | −31.20100 | 1.00000 | 1.73800 | 32.3 |
| 45 | 66.43210 | 0.20000 | | |
| 46 | 66.10450 | 5.88340 | 1.43700 | 95.1 |
| 47 | −37.48270 | variable | | |
| 48 | 38.00430 | 6.69980 | 1.49700 | 81.6 |
| 49 | −81.62250 | variable | | |
| 50 | 33.17740 | 1.50000 | 1.73800 | 32.3 |
| 51 | 22.42520 | 12.83290 | | |
| 52 | 33.02970 | 8.89070 | 1.43700 | 95.1 |
| 53 | −83.01360 | 13.39890 | | |
| 54 | ∞ | 25.00000 | 1.58913 | 61.3 |
| 55 | ∞ | 1.00000 | | |
| 56 | ∞ | 3.00000 | 1.50847 | 61.2 |
| 57 | ∞ | 1.00000 | | |
| Image plane | ∞ | | | |

Aspherical data

7th surface

K = 0.00000E+00, A4 = 6.41234E−06,
A6 = −6.37533E−08, A8 = −8.72388E−12,
A10 = 0.00000E+00

8th surface

K = −7.58278E−01, A4 = 6.89232E−06,
A6 = −8.38725E−08, A8 = −6.99755E−10,
A10 = 1.71989E−12

19th surface

K = 0.00000E+00, A4 = 9.99788E−06,
A6 = −6.59581E−08, A8 = −2.28076E−11,
A10 = 1.72628E−13

20th surface

K = 0.00000E+00, A4 = 2.61871E−05,
A6 = 1.45912E−08, A8 = −1.72864E−10,
A10 = 3.69148E−13

29th surface

K = 0.00000E+00, A4 = 5.51089E−05,
A6 = −1.05828E−07, A8 = 2.41991E−11,
A10 = 0.00000E+00

30th surface

K = 0.00000E+00, A4 = 4.76768E−06,
A6 = −1.06416E−07, A8 = 5.99126E−11,
A10 = 0.00000E+00

TABLE 14

Various data (object distance 900 mm)

| Focal length | −4.1349 |
|---|---|
| F number | −2.00006 |
| Angle of view | −70.0142 |
| Image height | 11.6200 |

Various data (object distance 600 mm)

| d4 | 1.0886 |
|---|---|
| d20 | 0.7048 |

Various data (object distance 2400 mm)

| d4 | 1.1296 |
|---|---|
| d20 | 0.2000 |

TABLE 15

Single lens data

| Lens element | First surface | Focal length |
|---|---|---|
| 1 | 1 | −151.7328 |
| 2 | 3 | 250.9681 |
| 3 | 5 | −41.2750 |
| 4 | 7 | −38.7572 |
| 5 | 9 | 46.4776 |
| 6 | 11 | 154.2928 |
| 7 | 13 | 34.6289 |
| 8 | 15 | −22.3050 |
| 9 | 17 | 48.6622 |
| 10 | 19 | 64.6342 |
| 11 | 21 | 84.2171 |
| 12 | 23 | 67.6498 |
| 13 | 25 | 70.8643 |
| 14 | 27 | −25.2283 |
| 15 | 29 | −28.4373 |
| 16 | 31 | 67.7512 |
| 17 | 33 | 124.2369 |
| 18 | 35 | −32.7620 |
| 19 | 37 | 43.5274 |
| 20 | 39 | 79.4989 |
| 21 | 41 | −140.0810 |
| 22 | 44 | −28.6423 |
| 23 | 46 | 55.6981 |
| 24 | 48 | 53.1632 |
| 25 | 50 | −99.6656 |
| 26 | 52 | 55.3592 |

Table 16 below shows the corresponding values of the respective conditional expressions in the respective numerical examples.

TABLE 16

| Condition | Example 1 | Example 2 | Example 3 | Example 4 |
|---|---|---|---|---|
| (1) | 0.68 | 0.70 | 0.25 | 1.15 |
| (2) | 0.03 | 0.04 | 0.03 | 0.04 |
| (3) | 0.00 | 0.00 | 0.00 | 0.00 |
| (4) | 1.94 | 1.98 | 2.65 | 1.93 |
| (5) | 3.26 | 3.38 | 2.48 | 3.85 |
| (6) | 10.29 | 10.34 | 10.34 | 10.50 |
| (1) | 70.01 | 70.03 | 70.04 | 70.01 |

In examples 1 to 4 as described above, when the flange back distance error becomes longer by, e.g., 0.1 mm, the flange back distance correction lens group FBG moves toward the reduction side by approximately 0.07 mm to 0.67 mm. Incidentally, the moving direction may be changed depending on the optical power of the flange back distance correction lens group FBG. Specifically, the flange back distance correction lens group FBG moves toward the reduction side by approximately 1.47 mm in example 1, toward the reduction side approximately 1.43 mm in example 2, toward the reduction side approximately 4 mm in example 3, and approximately 0.87 mm in example 4, resulting in corrected flange back distance.

Second Embodiment

Figure 22:
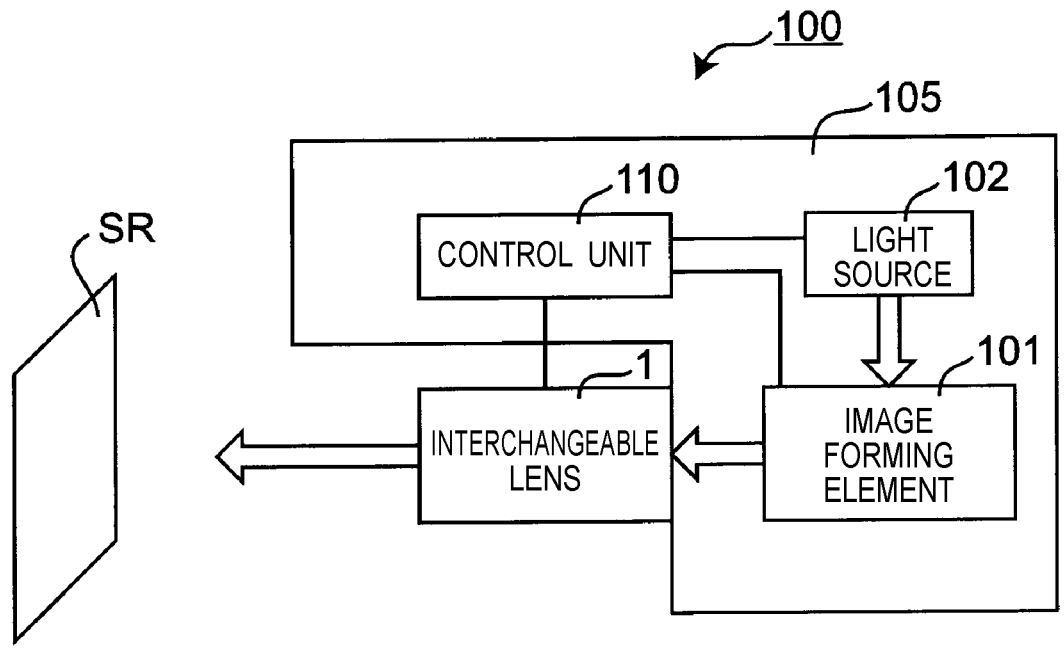
FIG. 22 is a block diagram showing an example of an image projection apparatus according to the present disclosure.

Hereinafter, a second embodiment of the present disclosure is described with reference to FIG. 22. FIG. 22 is a block diagram showing an example of the image projection apparatus according to the present disclosure. The image projection apparatus 100 includes such an interchangeable lens 1 and such an apparatus body 105 as disclosed in the first embodiment. The apparatus body 105 includes an image forming element 101, a light source 102, a control unit 110, and others. The interchangeable lens 1 can be configured to be detachably attached to the apparatus body 105. The image forming element 101 is constituted of, for example, liquid crystal or DMD, for generating an image to be projected through the interchangeable lens 1 onto a screen SR. The light source 102 is constituted of such as a light emitting diode (LED) or a laser, and supplies light to the image forming element 101. The control unit 110 is constituted of, for example, central processing unit (CPU) or micro-processing unit (MPU), for controlling the entire apparatus and respective components. By way of example, the control unit 110 can control and drive the focus drive unit 11 as shown in FIG. 1 during focusing of the interchangeable lens 1. In case of the interchangeable lens 1 being a zoom lens system, the control unit 110 can also control zooming of the interchangeable lens 1. Further, the control unit 110 can also control the flange back distance adjustment mechanism 12 as shown in FIG. 1. The control unit 110 may drive the flange back distance adjustment mechanism 12, for example, during attachment of the interchangeable lens 1 and fix the flange back distance adjustment mechanism 12 during focusing or zooming.

The image projection apparatus 100 described above can reduce an impact of a flange back distance error while suppressing an occurrence of curvature of field even when the apparatus body has the flange back distance error by employing the interchangeable lens 1 according to the first embodiment.

Third Embodiment

Figure 23:
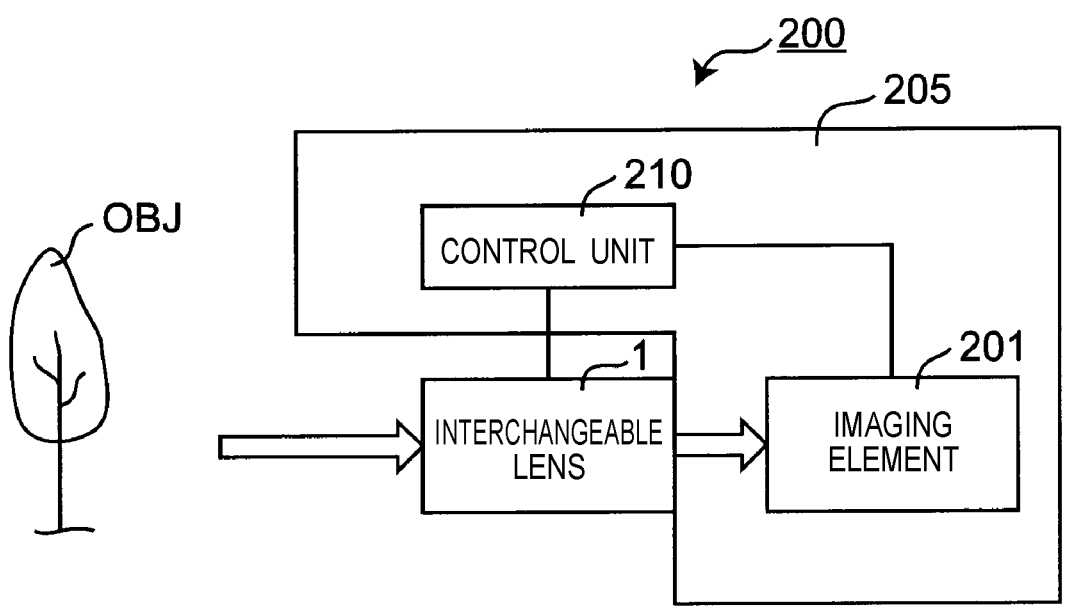
FIG. 23 is a block diagram showing an example of an imaging apparatus according to the present disclosure.

Hereinafter, a third embodiment of the present disclosure is described with reference to FIG. 23. FIG. 23 is a block diagram showing an example of the imaging apparatus according to the present disclosure. The imaging apparatus 200 includes such an interchangeable lens 1 as disclosed in the first embodiment and an apparatus body 205. The apparatus body 205 includes an imaging element 201, a control unit 210, and others. The interchangeable lens 1 can be configured to be detachably attached to the apparatus body 205. The imaging element 201 is constituted of, for example, charge coupled device (CCD) image sensor or complementary metal oxide semiconductor (CMOS) image sensor, for receiving an optical image of an object OBJ formed by the interchangeable lens 1 to convert the image into an electrical image signal. The control unit 210 is constituted of for example, CPU or MPU, for controlling the entire apparatus and respective components. By way of example, the control unit 110 can control the focus drive unit 11 and the flange back distance adjustment mechanism 12 as shown in FIG. 1 in a manner similar to the second embodiment.

The imaging apparatus 200 described above can reduce an impact of a flange back distance error while suppressing an occurrence of curvature of field even when the apparatus body has the flange back distance error by employing the interchangeable lens 1 according to the first embodiment.

As described above, the embodiment 1 to 3 have been described to disclose the technology in the present disclosure. To that end, the accompanying drawings and detailed description are provided. However, the technology in this disclosure is not limited thereto, but also can be applied to other embodiments in which modification, substitution, addition, omission and so on have been made optionally. Further, new embodiments can be made by combining the respective components described in the respective embodiments. Thus, other embodiments will exemplified below.

In the above-described respective embodiments, a single lens, a lens group including a plurality of lenses, or a compound lens can be used for the above-described lens, lens element and lens group. By way of example, the above-described respective examples exemplify the flange back distance correction lens group FBG being configured of two pieces of lens elements, but the flange back distance correction lens group FBG is not limited thereto. The flange back distance correction lens group FBG may be configured of three or more pieces of lens elements or one piece of lens element.

As described above, the embodiments have been described to disclose the technology in the present disclosure. To that end, the accompanying drawings and detailed description are provided.

Therefore, among the components described in the accompanying drawings and the detailed description, not only the components that are essential for solving the problem, but also the components that are not essential for solving the problem may also be included in order to exemplify the above-described technology. Therefore, it should not be directly appreciated that the above non-essential components are essential based on the fact that the non-essential components are described in the accompanying drawings and the detailed description.

Further, the above-described embodiments have been described to exemplify the technology in the present disclosure. Thus, various modification, substitution, addition, omission and so on can be made within the scope of the claims or equivalents thereof.

INDUSTRIAL APPLICABILITY

The present disclosure can be applied to image projection apparatuses such as projectors and head-up displays, and imaging apparatuses such as digital still cameras, digital video cameras, surveillance cameras in surveillance systems, web cameras, and onboard cameras. In particular, the present disclosure can be applied to optical systems that require a high image quality, such as projectors, digital still camera systems, and digital video camera systems.

The invention claimed is:

1. An interchangeable lens that can be detachably attached to an apparatus body having an image forming surface on which an image is formed, and the interchangeable lens having a magnification conjugate point on a magnification side and a reduction conjugate point on a reduction side, the interchangeable lens including:
   a plurality of lens groups arranged in order from the magnification side to the reduction side, each of which can be fixed or moved independently of each other,
   wherein a first lens group located closest to the magnification side among the plurality of lens groups including:
      a focus lens group that can move along an optical axis to adjust a focus at the magnification conjugate point; and
      a flange back distance correction lens group, located closer to the reduction side than the focus lens group, that can move along the optical axis to correct an error in a flange back distance of the interchangeable lens with respect to the image forming surface,
   wherein the interchangeable lens further includes a field curvature correction lens group configured of a part of the lens elements constituting the focus lens group so as to correct a field curvature aberration on the magnification conjugate point by moving along the optical axis after the focus adjustment.

2. The interchangeable lens according to claim 1, wherein the flange back distance correction lens group is adjusted in position after the interchangeable lens is attached to the apparatus body, and the focus lens group is adjusted in position to adjust a focus after adjustment in position of the flange back distance correction lens group.

3. The interchangeable lens according to claim 1, satisfying the following condition (1):

$$0.15 < |\{1-(\beta bw^2)\} \times (\beta brw^2)| < 1.40 \quad (1)$$

where $\beta bw$ is a paraxial lateral magnification at the wide-angle end, of the flange back distance correction lens group, and $\beta brw$ is a paraxial lateral magnification at the wide-angle end, of all lenses positioned on the reduction side with respect to the flange back distance correction lens group.

4. The interchangeable lens according to claim 1, satisfying the following condition (2):

$$0.1 < |\{1-(\beta fw^2)\} \times (\beta frw^2)| < 0.15 \quad (2)$$

where $\beta fw$ is a paraxial lateral magnification at the wide-angle end, of the focus lens group, and $\beta frw$ is a paraxial lateral magnification at the wide-angle end, of all lenses positioned on reduction side with respect to the focus lens group.

5. The interchangeable lens according to claim 1, satisfying the following condition (3):

$$|\{1-(\beta cw^2)\} \times (\beta crw^2)| < 0.01 \quad (3)$$

where $\beta cw$ is a paraxial lateral magnification at the wide-angle end, of the field curvature correction lens group, and $\beta crw$ is a paraxial lateral magnification at the wide-angle end, of all lenses positioned on the reduction side with respect to the field curvature correction lens group.

6. The interchangeable lens according to claim 1, satisfying the following condition (6):

$$5 < fb/fw < 30 \quad (6)$$

where fw is a focal length of the entire optical system at the wide-angle end, and fb is a back focus of the entire optical system.

7. The interchangeable lens according to claim 1, satisfying the following condition (7):

$$|\omega| > 60 \quad (7)$$

where, $\omega$ is a maximum half angle of view at the wide-angle end.

8. The interchangeable lens according to claim 1, wherein an intermediate imaging position that is conjugated to the magnification conjugate point on the magnification side and the reduction conjugate point on the reduction side, respectively, is positioned between the focus lens group and the flange back distance correction lens group.

9. The interchangeable lens according to claim 8, further including:
a relay optical system having the flange back distance correction lens group and a plurality of lens elements, positioned on the reduction side with respect to the intermediate imaging position and satisfies the following condition (5):

$$2 < fr/fw < 4 \quad (5)$$

where fw is a focal length of the entire optical system at the wide-angle end, and fr is a focal length of the relay optical system at the wide-angle end.

10. The interchangeable lens according to claim 8, further including:
a magnification optical system having the focus lens group and a plurality of lens elements, positioned on the magnification side with respect to the intermediate imaging position and satisfying the following condition (4):

$$1 < ff/fw < 3 \quad (4)$$

where fw is a focal length of the entire optical system at the wide-angle end, and ff is a focal length of the magnification optical system.

11. The interchangeable lens according to claim 8, wherein the flange back distance correction lens group includes a lens element located closest to the intermediate imaging position on the reduction side.

12. An image projection apparatus comprising:
the interchangeable lens according to claim 1; and
an image forming element that generates an image to be projected through the interchangeable lens onto a screen.

13. An imaging apparatus comprising:
the interchangeable lens according to claim 1; and
an imaging element that receives an optical image formed by the interchangeable lens to convert the optical image into an electrical image signal.

14. The interchangeable lens according to claim 1, wherein each of the plurality of lens groups is fixed or moved independently of each other for zooming, and
during zooming, the first lens group including the flange back distance correction lens group is fixed.

* * * * *